US011383689B2

(12) United States Patent
Engelbert et al.

(10) Patent No.: US 11,383,689 B2
(45) Date of Patent: Jul. 12, 2022

(54) BRAKE MONITORING SYSTEM WITH TEMPERATURE MONITORING

(71) Applicant: HALDEX BRAKE PRODUCTS CORPORATION, Kansas City, MO (US)

(72) Inventors: David G. Engelbert, Weatherby Lake, MO (US); James Greene, Lawson, MO (US); Charles Yurkonis, Savannah, MO (US); Marcos J. DeLeon, Kansas City, KS (US); Michael R. Jenkins, Kansas City, MO (US)

(73) Assignee: HALDEX BRAKE PRODUCTS CORPORATION, Kansas City, MO (US)

(*) Notice: Subject to any disclaimer, the term of this patent is extended or adjusted under 35 U.S.C. 154(b) by 502 days.

(21) Appl. No.: 16/417,796

(22) Filed: May 21, 2019

(65) Prior Publication Data
US 2019/0359196 A1 Nov. 28, 2019

Related U.S. Application Data

(60) Provisional application No. 62/675,423, filed on May 23, 2018.

(51) Int. Cl.
B60T 17/22 (2006.01)
B60C 23/20 (2006.01)

(52) U.S. Cl.
CPC ............ B60T 17/221 (2013.01); B60C 23/20 (2013.01)

(58) Field of Classification Search
CPC .................. B60T 17/221; B60C 23/20
See application file for complete search history.

(56) References Cited

U.S. PATENT DOCUMENTS 4,591,213 A 5/1986 Rapoport
5,136,508 A 8/1992 Bannon
5,189,391 A 2/1993 Feldmann
(Continued)

FOREIGN PATENT DOCUMENTS

CN 106585586 A 4/2017

OTHER PUBLICATIONS

Haldex, Technical Information—ITCM™ (Intelligent Trailer Control Module), 2 pages, L25125W US Feb. 2017, haldex.com.
(Continued)

Primary Examiner — Vishal R Sahni
(74) Attorney, Agent, or Firm — Stinson LLP

(57) ABSTRACT

A method for monitoring a wheel system by comparing a wheel end temperature to a wheel end temperature threshold; generating a brake monitoring signal when at least one brake monitoring condition has occurred; and generating a wheel monitoring signal if a brake monitoring signal is generated when the wheel end temperature is greater than the wheel end temperature threshold. The brake monitoring conditions may include (i) a brake supply pressure is less than a brake supply pressure threshold; (ii) a brake control pressure is greater than a first brake control pressure threshold and a stop lamp power signal is not present; and/or (iii) the stop lamp power signal is present and the brake control pressure is not greater than a second brake control pressure threshold. A brake monitoring system configured to monitor a wheel system.

27 Claims, 19 Drawing Sheets

(56) References Cited

U.S. PATENT DOCUMENTS

| | | | |
|---|---|---|---|
| 5,722,740 | A | 3/1998 | Engelbert |
| 5,892,437 | A | 4/1999 | Scheibe |
| 6,206,489 | B1 | 3/2001 | Schmidt |
| 6,595,045 | B1 | 7/2003 | Fuglewicz |
| 6,680,672 | B2 | 1/2004 | Borugian |
| 6,738,697 | B2 | 5/2004 | Breed |
| 6,804,598 | B2 | 10/2004 | Eckert |
| 6,891,468 | B2 | 5/2005 | Koenigsberg |
| 6,934,618 | B2 | 8/2005 | Eckert |
| 7,009,508 | B2 | 3/2006 | Vertenten |
| 7,142,102 | B2 | 11/2006 | Darroman |
| 7,244,003 | B2 * | 7/2007 | Larson ............... B60T 8/00 188/1.11 L |
| 7,712,588 | B2 | 5/2010 | Caron |
| 8,108,118 | B2 | 1/2012 | Greene |
| 8,204,668 | B2 | 6/2012 | Greene |
| 8,319,623 | B2 | 11/2012 | Wallace |
| 8,511,929 | B2 | 8/2013 | Raye |
| 8,630,753 | B2 | 1/2014 | Cahill |
| 8,717,159 | B2 | 5/2014 | Todd |
| 8,777,169 | B2 | 7/2014 | Raye |
| 8,843,254 | B2 | 9/2014 | Cahill |
| 9,168,900 | B2 * | 10/2015 | Greene ............... B60T 17/22 |
| 9,211,774 | B2 | 12/2015 | Swanson |
| 9,267,520 | B2 | 2/2016 | Raye |
| 9,415,759 | B2 * | 8/2016 | Greene ............... B60T 7/18 |
| 9,440,632 | B2 * | 9/2016 | Bennett ............... B60T 8/176 |
| 9,447,832 | B2 | 9/2016 | Todd |
| 9,604,611 | B2 | 3/2017 | Raye |
| 2011/0236128 | A1 | 9/2011 | Raye |
| 2013/0138293 | A1 * | 5/2013 | Greenwood ....... B60C 23/0415 701/36 |
| 2018/0037209 | A1 | 2/2018 | Hecker |
| 2019/0023252 | A1 * | 1/2019 | Miller, Jr. ............ B60T 17/221 |
| 2019/0184950 | A1 | 6/2019 | Williams |
| 2019/0359196 | A1 * | 11/2019 | Engelbert ............ B60C 23/20 |

OTHER PUBLICATIONS

Haldex, Installation/Service Manual—ITCM™ Intelligent Trailer Control Module (L31286), 48 pages, L31286W US Rev. Jun. 2017, haldex.com.

Haldex, Installation/Service Manual—Haldex Modular Trailer System (HMTS) with Brake Monitoring System (BMS) L31293W, 20 pages, L31293W US Jun. 2017, haldex.com.

Haldex, Installation/Service Manual—Brake Monitoring System (BMS) Auxiliary used with Intelligent Trailer Control Module (ITCM), 16 pages, L31290W US Jun. 2017, haldex.com.

Haldex, Installation/Service Guide—2S/1M—4S/2M PLC Select Anti-Lock Braking Systems (L30041), 48 pages, US Dec. 2016, haldex.com.

Haldex, Haldex PLC Select ABS Platform L20337, 6 pages, US Jul. 2014, haldex.com.

The University of Michigan Transportation Research Institute, Engineering Research Division, "Simplified Models of Truck Braking and Handling", Version 3.0, Sep. 1990 (222 pgs).

Johnson, L., et al., The University of Michigan, Highway Safety Research Institute, "An Empirical Model for the Prediction of the Torque Output of Commercial Vehicle Air Brakes", Dec. 1978 (87 pgs).

Yan, M., et al., "Prediction Model for Brake-Drum Temperature of Large Trucks on Consecutive Mountain Downgrade Routes Based on Energy Conservation Law", Mathematical Problems in Engineering, vol. 2018, Article ID 4587673, Sep. 30, 2018 (11 pgs).

Parmigiani, J., et al., "The Transient Temperature Distribution in a Heavy Duty Brake System During Fatigue Crack Testing", SAE Transactions, vol. 109, Section 6: Journal of Passenger Cars: Mechanical Systems Journal (2000) (7 pgs).

Neys, A., Chalmers University of Technology, Department of Applied Mechanics, "In-Vehicle Brake System Temperature Model", Report No. 2012:38, 2012 (82 pgs).

Finnved, S., et al., Lund University, Department of Automatic Control, "Temperature Estimation in Trailer Disc Brake", 2015 (79 pgs).

Ciavarella, M., Blog Discussion, Is Wear Law Really Archard's law (1953), or Reye's law (1860)?, downloaded from the internet at https://imechanica.org/node/15253 on Feb. 19, 2020. (5 pgs).

Archard, J., et al., "The Wear of Metals Under Unlubricated Conditions", vol. 236, Issue 1206, Feb. 25, 1956, Revised Apr. 3, 1956 (15 pgs).

Rashid, M., "Wear Analysis of a Disc Brake Assembly" published on this website 5 years ago: https://www.yumpu.com/en/document/view/26229283/wear-analysis-of-a-disc-brake-assembly-fkm (34 pgs).

Abu Bakar, A., et al., "Wear Simulations and its Effect on Disc Brake Contact Pressure Distribution and Squeal" (2013) (11 pgs).

Fransson, C., "Pressure to Torque Gain Estimations for Pneumatic Disc Brakes with Use of Slip and Friction Based Methods in Heavy Duty Trucks", Degree Project, Department of Management and Engineering, Linkopings Universitet, Feb. 28, 2009 (60 pgs).

Pamphlet, "GreyRock™. Brake Problems Stop Here", LG200003, Rev. 11-88, 1989 (9 pgs).

Pamphlet, "GreyRock®. Diagnostic Engineering Service", Form No. 6305 Rev. 3/84, 1982 (20 pgs).

Dalimus, Z., "Braking System Modeling and Brake Temperature Response to Repeated Cycle", Mechatronics, Electrical Power, and Vehicular Technology 05, Dec. 24, 2014 (6 pgs).

Duffy, D., Example 12.11.2: Heat dissipation in disc brakes, "Advanced Engineering Mathematics with MATLAB®", Fourth Edition, 2016, pp. 640-643. (4 pgs).

Villaggio, P., "Wear of an Elastic Block", Meccanica 36: 243-249, 2001 (7 pgs).

\* cited by examiner

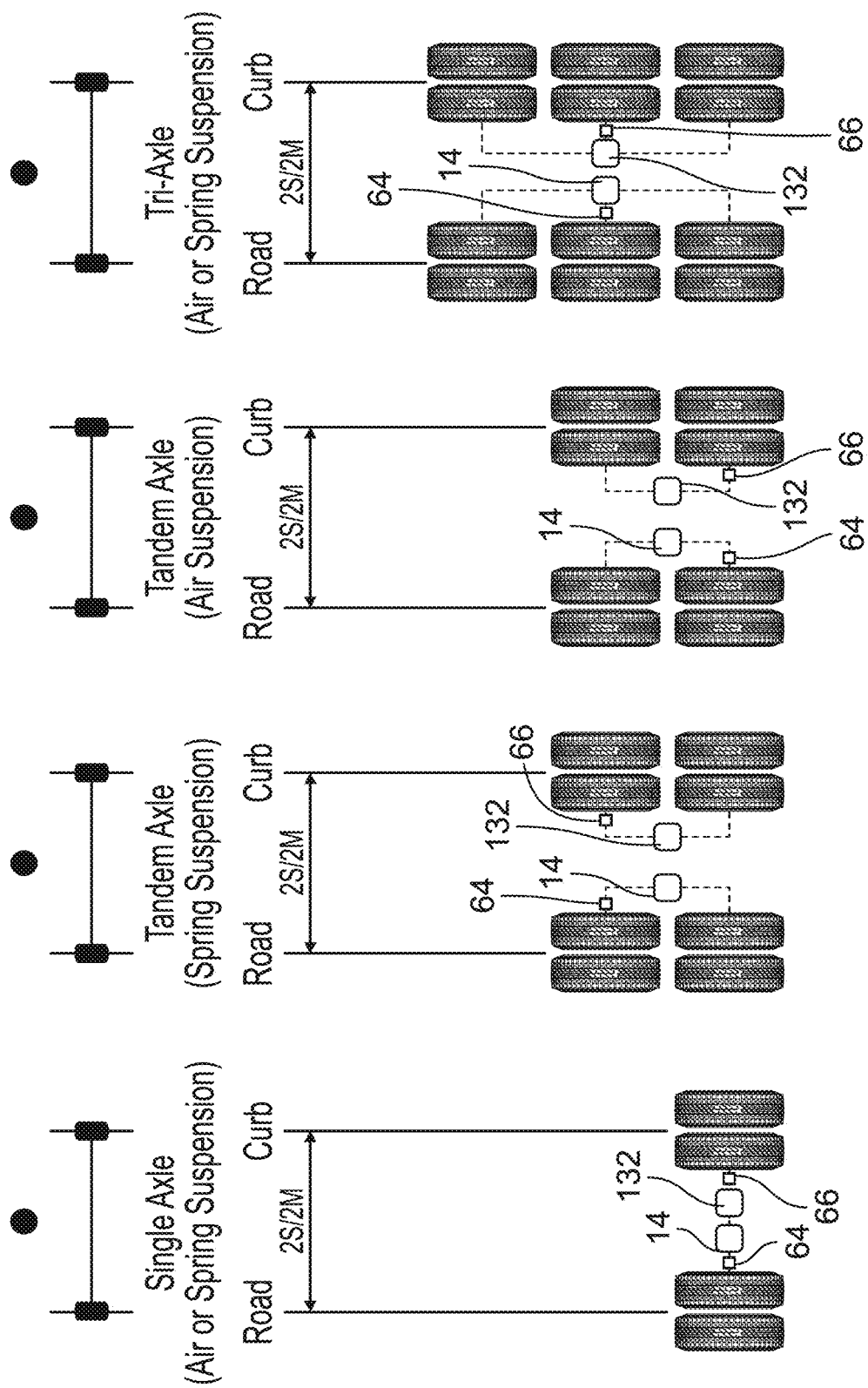

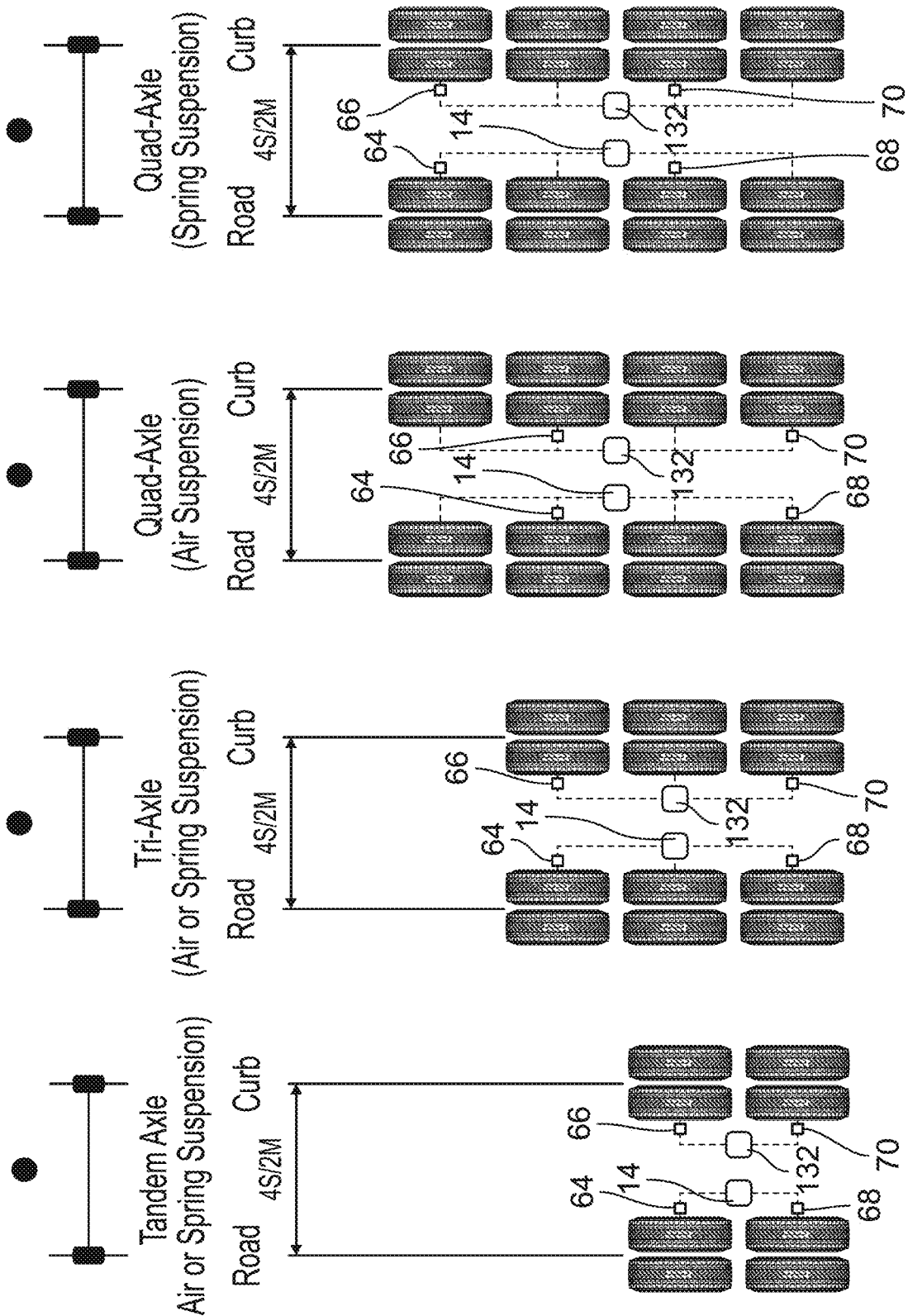

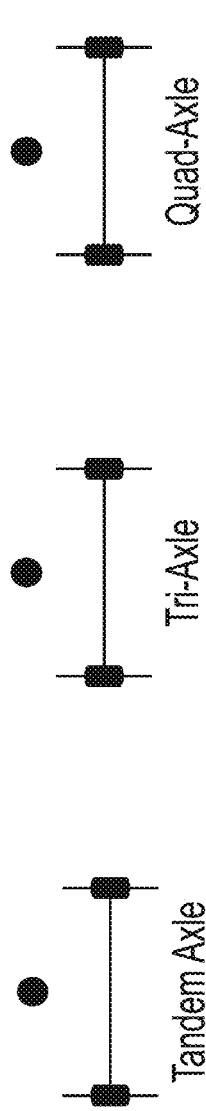

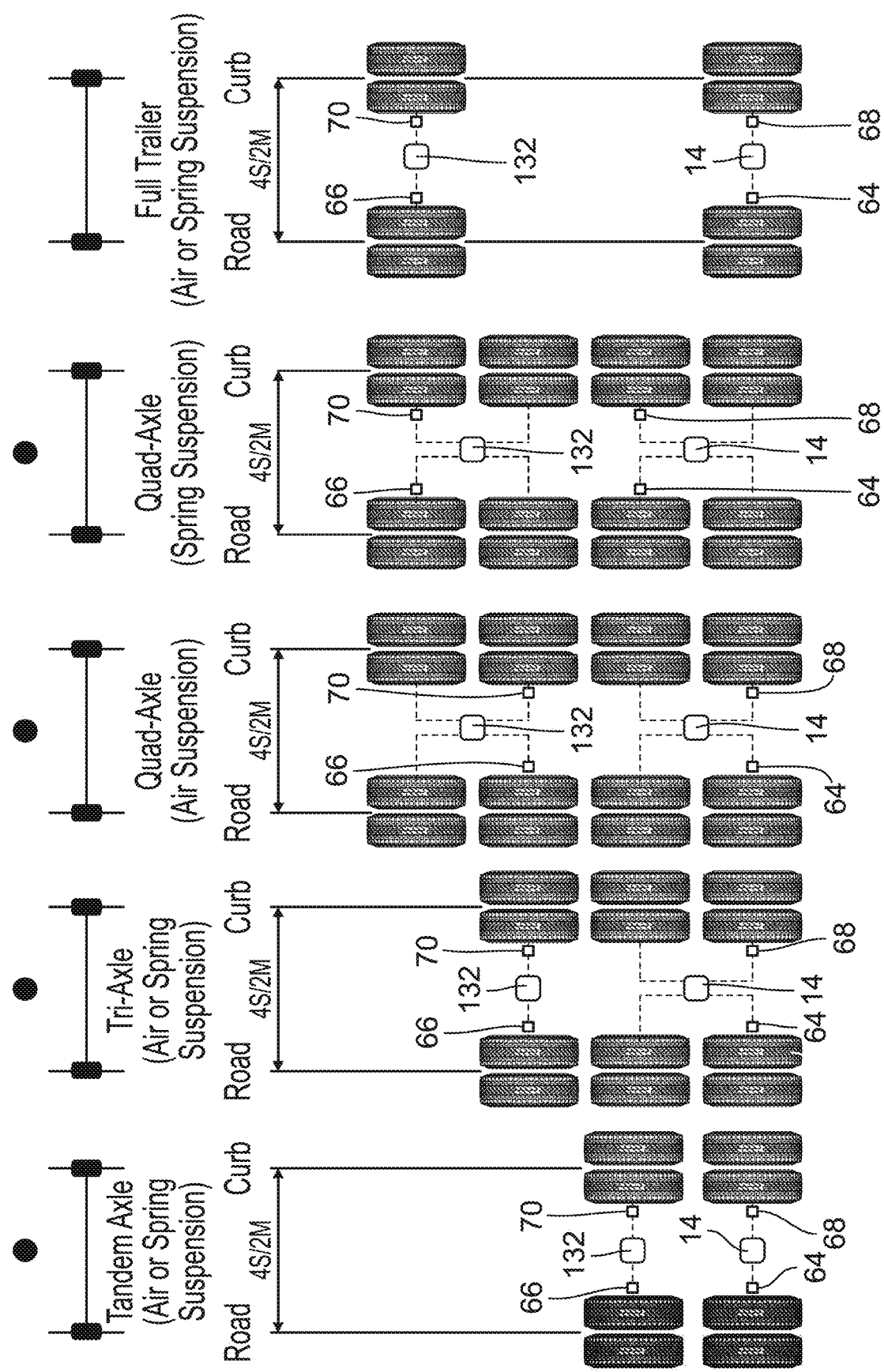

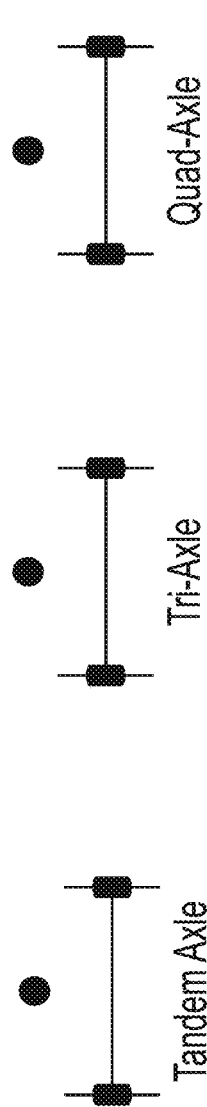

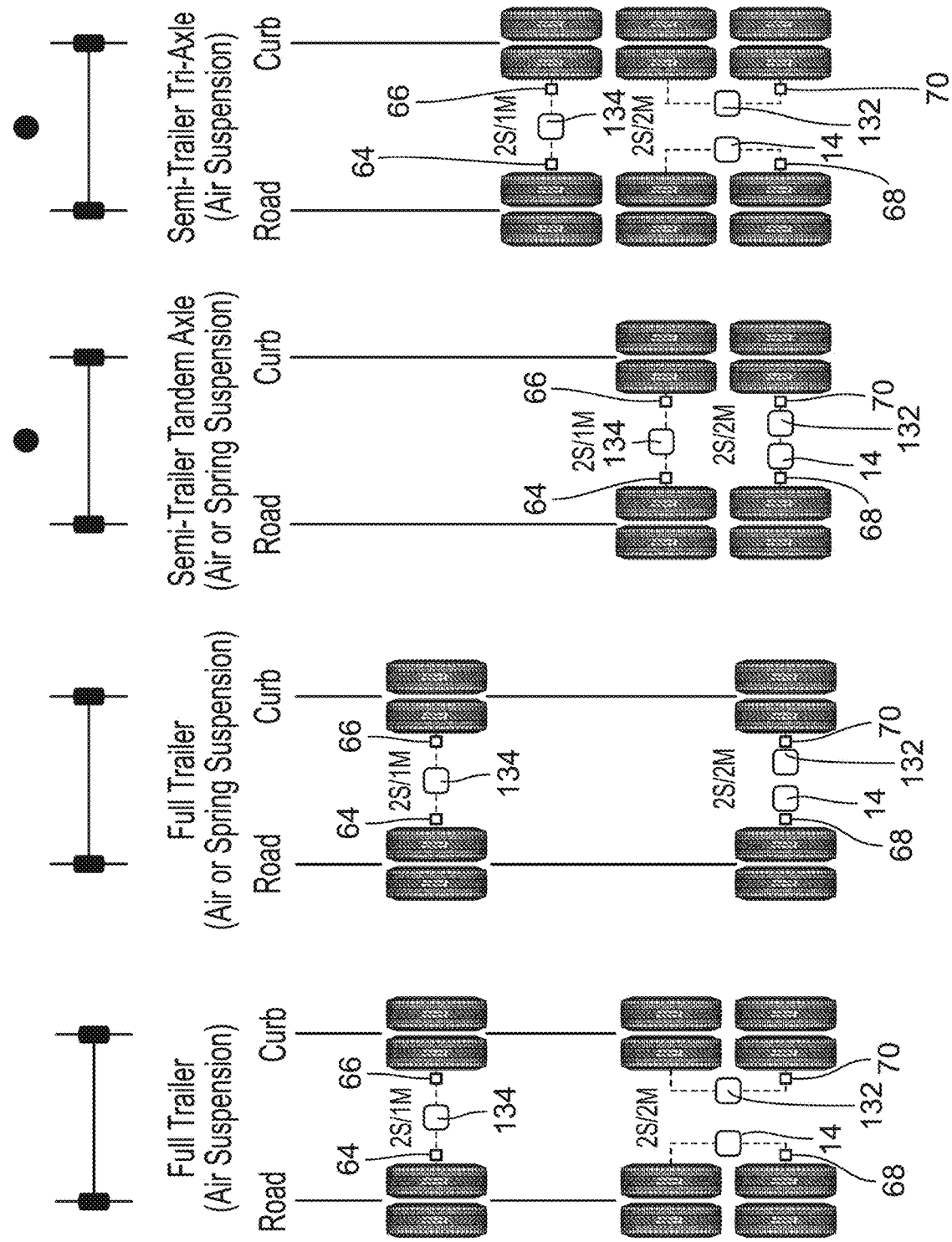

BRAKE MONITORING SYSTEM WITH TEMPERATURE MONITORING

CROSS-REFERENCE TO RELATED APPLICATIONS

This application is based on and claims priority to U.S. Provisional Application Ser. No. 62/675,423, filed on May 23, 2018, which is incorporated herein by reference in its entirety.

STATEMENT REGARDING FEDERALLY SPONSORED RESEARCH OR DEVELOPMENT

Not applicable.

STATEMENT REGARDING JOINT RESEARCH AGREEMENT

Not applicable.

BACKGROUND OF THE INVENTION

1. Field of the Invention

The present application relates generally to vehicle wheel system monitoring and, in particular, to a brake monitoring system and method with temperature monitoring.

2. Description of Related Art

Air operated braking systems have long been utilized to control commercial vehicles such as trucks and trailers, which typically have large gross vehicle weights, in a safe and effective manner. The considerable inertial mass of these heavy-duty vehicles, in combination with the high speeds at which they travel, requires a braking system which responds rapidly with substantial braking power. A spring brake actuator is used in air operated braking systems to provide the force necessary for braking a heavy-duty vehicle.

In a typical spring brake system, braking force may be applied in a number of ways. For normal braking operation, compressed air is introduced into the brake chamber, which co-acts with a diaphragm, such as, for example, an elastomeric diaphragm, and a push rod to apply braking force. For emergency and/or parking brake applications, a power spring stores potential energy and exerts the large force required for braking in case of loss of air pressure or air pressure failure. During normal driving operation, compressed air acts on a diaphragm to compress the power spring to maintain the braking system in a released position. When the compressed air is released, the force of the power spring overcomes the force of the compressed air such that the power spring expands co-acting with the diaphragm and push rod. This in turn, applies a braking force in case of failure of the system air pressure or exhaustion of compressed air while the vehicle is not in operation or is parked.

A loss of compressed air in typical air brake systems means that the power spring applies a braking force to prevent the vehicle from moving. Accordingly, some systems have provided for an emergency/supply pressure line to the braking system such that, in the event of a loss of air pressure on the primary service/control line to the brake system, compressed air will still flow to the brake via an emergency/supply air pressure line. While this configuration will provide a functioning system in the event of catastrophic failure of the service/control line, this system will not provide information to the driver regarding the efficiency of the braking system. For example, the service/control line may suffer from a leaky connection causing substantial leaking of the compressed air. There may be enough air pressure in the system to allow for operation of the vehicle, but the vehicle may suffer from brake drag, meaning the air pressure is not high enough to completely overcome the power spring such that the brake is partially applied during normal driving operation.

Another problem that prior art systems face is the provision of stoplight power to the trailer when the brakes are applied. If, for example, the stoplight switch is faulty, stoplight power can be present at the trailer without service/control pressure.

If a braking system malfunctions, the malfunction may lead to brake drag and an associated increase in the temperature of the wheel end. If the malfunction is not addressed, the temperature increase may lead to a fire at the wheel end.

BRIEF SUMMARY OF THE INVENTION

A method for monitoring a wheel system in accordance with one embodiment of the invention described herein includes comparing a wheel end temperature to a wheel end temperature threshold; generating a brake monitoring signal when at least one brake monitoring condition has occurred; and generating a wheel monitoring signal if a brake monitoring signal is generated when the wheel end temperature is greater than the wheel end temperature threshold. The brake monitoring conditions may include (i) a brake supply pressure is less than a brake supply pressure threshold; (ii) a brake control pressure is greater than a first brake control pressure threshold and a stop lamp power signal is not present; and/or (iii) the stop lamp power signal is present and the brake control pressure is not greater than a second brake control pressure threshold.

The method may include generating at least one of a visible alarm or an audible alarm after the wheel monitoring signal is generated. The visible alarm or audible alarm may be generated so that it may be viewed or heard by a driver of a vehicle.

The method may include receiving the wheel end temperature threshold prior to the step of comparing the wheel end temperature to the wheel end temperature threshold.

The method may include measuring the wheel end temperature of a wheel end with a wheel end temperature sensor, and generating a wheel end temperature signal based on the wheel end temperature. The wheel end temperature signal may be generated in an SAE J1939 format. The wheel end temperature signal may be sent to a controller area network ("CAN") port of a control module, and the wheel end temperature may be extracted from the wheel end temperature signal with a processor of the control module. The processor may compare the wheel end temperature to the wheel end temperature threshold. The wheel end temperature sensor may be selected from the group consisting of a tire temperature sensor, a wheel bearing temperature sensor, and a brake actuator temperature sensor.

The method may further include: monitoring the brake supply pressure of a brake valve with a control module; monitoring the brake control pressure of the brake valve with the control module; and monitoring for the presence of the stop lamp power signal with the control module. A processor of the control module may perform the following steps: comparing the brake supply pressure to the brake supply pressure threshold; comparing the brake control pressure to the first brake control pressure threshold and to the second brake control pressure threshold. The processor may generate the brake monitoring signal when at least one of the brake monitoring conditions has occurred. The processor may compare the wheel end temperature to the wheel end temperature threshold, and the processor may generate the wheel monitoring signal if the brake monitoring signal is generated when the wheel end temperature is greater than the wheel end temperature threshold. Each of the first brake control pressure threshold and the second brake control pressure threshold may be between approximately 0 to 4 psi. The brake supply pressure threshold may be approximately equal to a minimum brake supply pressure level necessary to disengage a spring brake. The method may further include generating at least one of a visible alarm or an audible alarm when both the wheel monitoring signal is generated and a wheel slip condition is sensed.

A brake monitoring system in accordance with another aspect of the invention described herein includes a control module including a processor that is configured to: compare a wheel end temperature to a wheel end temperature threshold; generate a brake monitoring signal when at least one brake monitoring condition has occurred; and generate a wheel monitoring signal if a brake monitoring signal is generated when the wheel end temperature is greater than the wheel end temperature threshold. The brake monitoring conditions may include (i) a brake supply pressure is less than a brake supply pressure threshold; (ii) a brake control pressure is greater than a first brake control pressure threshold and a stop lamp power signal is not present; and/or (iii) the stop lamp power signal is present and the brake control pressure is not greater than a second brake control pressure threshold.

The brake monitoring system may further include a wheel end temperature sensor that is operable to measure the wheel end temperature of a wheel end. The wheel end temperature sensor may be electrically coupled to a CAN port of the control module. The wheel end temperature sensor may generate a wheel end temperature signal in an SAE J1939 format, and send the wheel end temperature signal to the CAN port. The wheel end temperature sensor may be selected from the group consisting of a tire temperature sensor, a wheel bearing temperature sensor, and a brake actuator temperature sensor.

The brake monitoring system may include a brake valve with an emergency brake pressure outlet that supplies air at the brake supply pressure, and a service brake pressure outlet that supplies air at the brake control pressure. A first pressure sensor may be coupled to the brake valve and electrically coupled to the control module, wherein the first pressure sensor measures the brake supply pressure and generates a brake supply pressure signal based on the brake supply pressure. A second pressure sensor may be coupled to the brake valve and electrically coupled to the control module, wherein the second pressure sensor measures the brake control pressure and generates a brake control pressure signal based on the brake control pressure. The processor may receive the brake supply pressure signal and determine the brake supply pressure corresponding to the brake supply pressure signal, and the processor may receive the brake control pressure signal and determine the brake control pressure corresponding to the brake control pressure signal.

The control module may include a power input that is configured for connection with a power line carrier ("PLC") cable, wherein the power input is configured to receive the stop lamp power signal from the PLC cable, and wherein the power input is configured to send the stop lamp power signal to the processor.

An alarm system may be electrically coupled to the control module, wherein the processor sends the wheel monitoring signal to the alarm system, and wherein the alarm system generates at least one of a visible alarm or an audible alarm when it receives the wheel monitoring signal. The alarm system may generate at least one of a visible alarm or an audible alarm when it receives both the wheel monitoring signal and a wheel slip signal corresponding to a wheel slip event.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

BRIEF DESCRIPTION OF THE DRAWINGS

FIGS. 8A-8D show 2S/2M configurations of the trailer brake and monitoring system of FIG. 1 for different types of multi-axle trailer configurations;

FIGS. 9A-9D show 4S/2M configurations of the trailer brake and monitoring system of FIG. 1 for different types of multi-axle trailer configurations;

FIGS. 10A-10C show 4S/2M configurations of the trailer brake and monitoring system of FIG. 1 for different types of multi-axle trailer with lift axle(s) configurations;

FIGS. 11A-11E show 4S/2M configurations of the trailer brake and monitoring system of FIG. 1 for different types of multi-axle trailer configurations, as recommended for spread axle applications;

FIGS. 12A-12C show 4S/2M configurations of the trailer brake and monitoring system of FIG. 1 for different types of multi-axle trailer with lift axle(s) configurations, as recommended for spread axle applications;

FIGS. 13A-13D show 4S/3M configurations of the trailer brake and monitoring system of FIG. 1 for different types of full and semi-trailer configurations;

DETAILED DESCRIPTION OF PREFERRED EMBODIMENT

Figure 1:
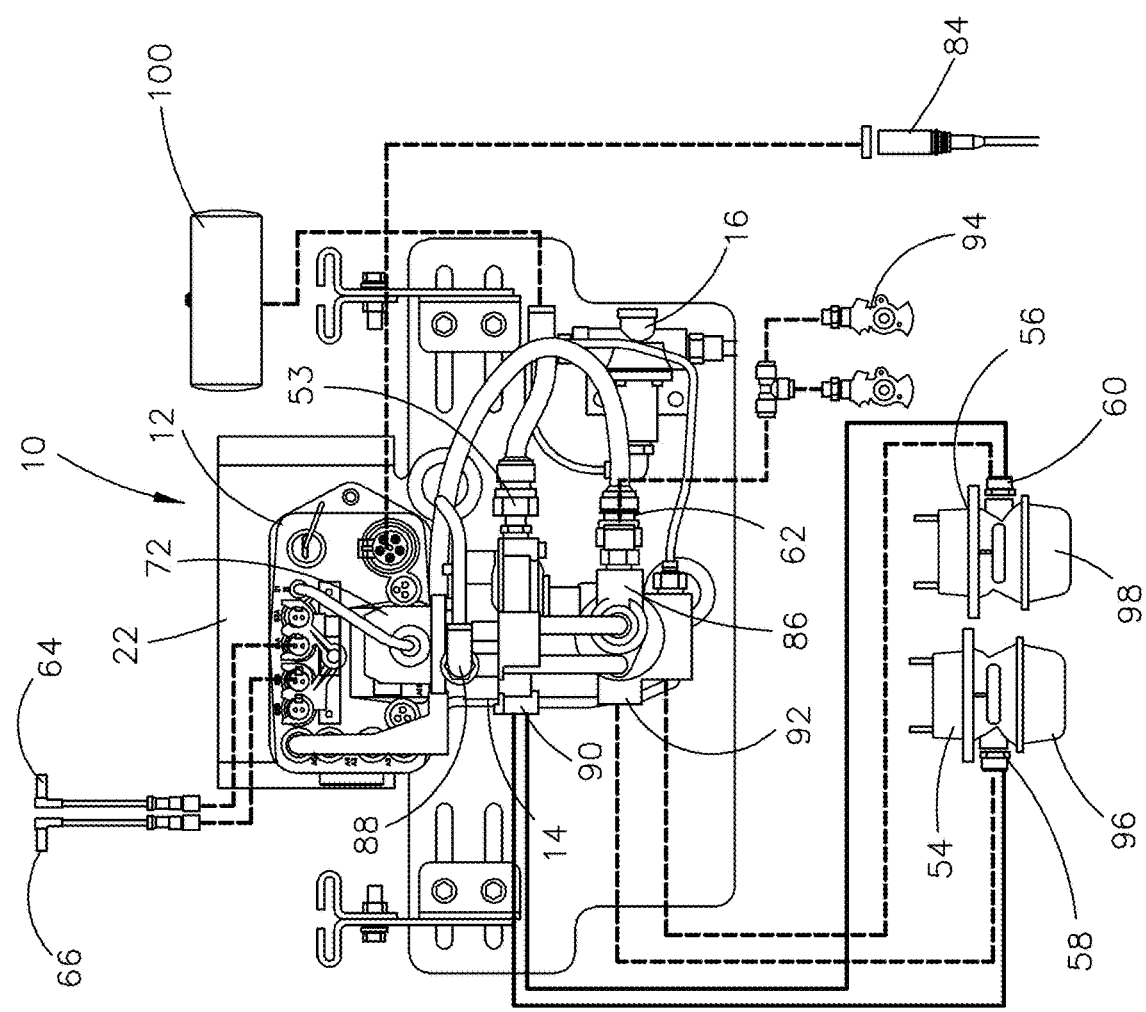
FIG. 1 is a front elevational view showing a trailer brake and monitoring system in accordance with one embodiment of the invention described herein.

A trailer brake and monitoring system in accordance with one embodiment of the invention described herein is identified generally with the reference numeral 10 in FIG. 1. The trailer brake and monitoring system includes a trailer control module 12, a brake valve 14, a reservoir purge valve 16, a booster valve 18 (FIG. 2), a communications device 20 (FIG. 4), and a mounting bracket 22 to which the trailer control module 12, brake valve 14, reservoir purge valve 16, and booster valve 18 are mounted.

Figure 3:
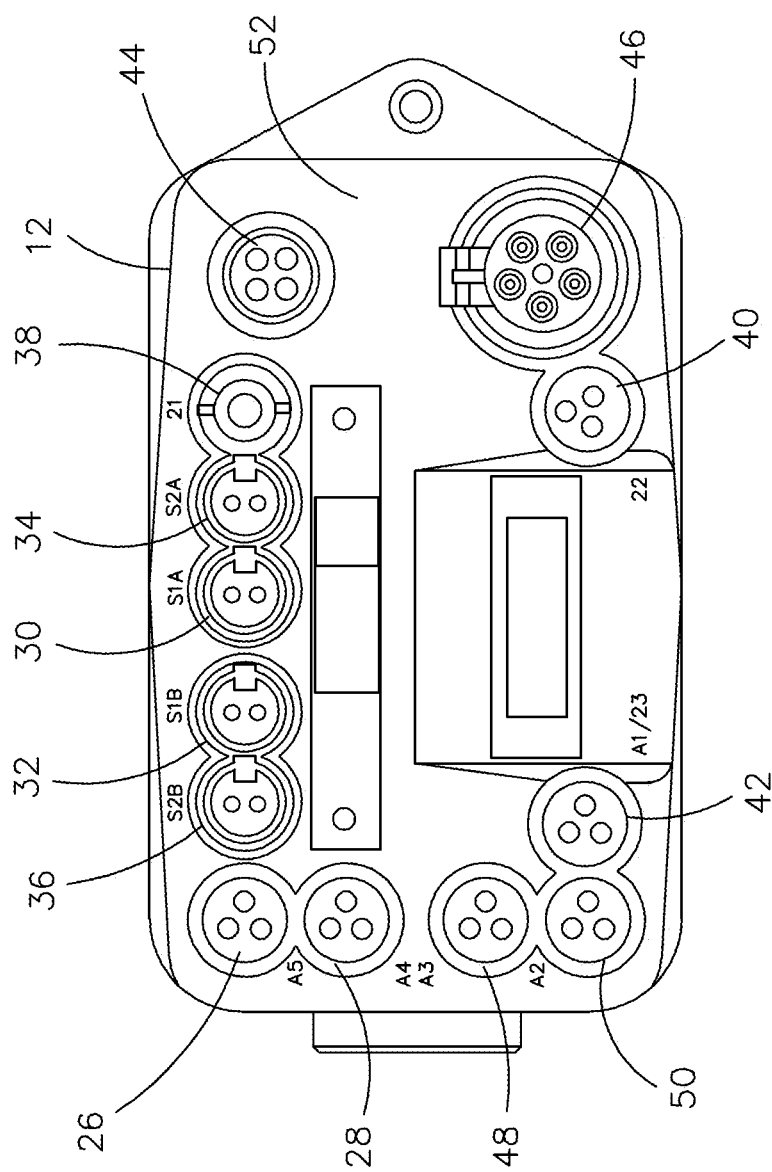
FIG. 3 is a front elevational view of a trailer control module of the trailer brake and monitoring system of FIG. 1.
Figure 6:
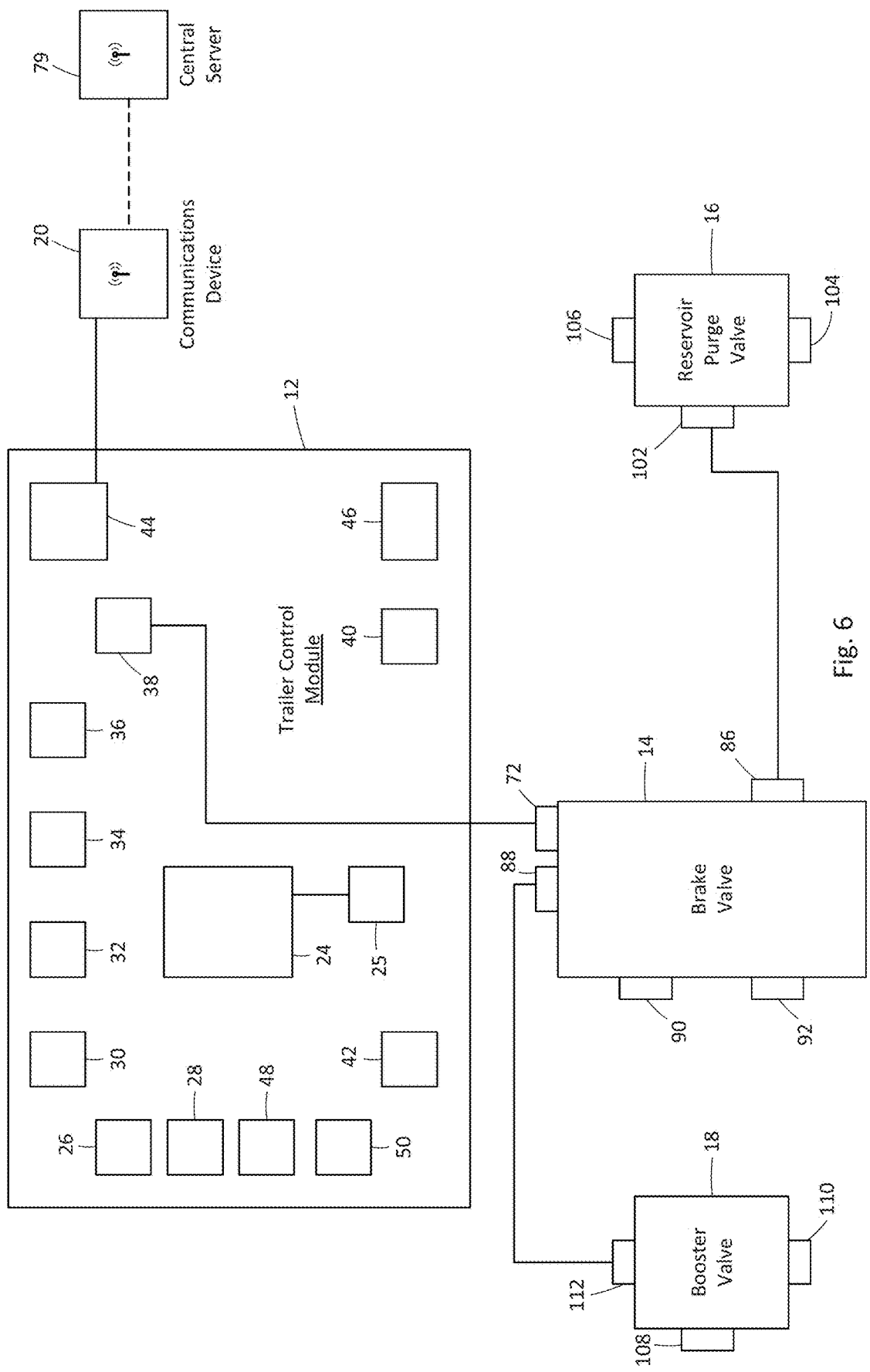
FIG. 6 is a schematic view of the trailer brake and monitoring system of FIG. 1.

Referring to FIG. 6, the trailer control module 12 includes a processor 24 that is electrically coupled with, configured to receive data or instructions from, and configured to transmit data or instructions to: a brake supply pressure input 26, a brake control pressure input 28, a first wheel speed input 30, a second wheel speed input 32, a third wheel speed input 34, a fourth wheel speed input 36, a first valve output 38, a second valve output 40, a third valve output 42, a controller area network ("CAN") port 44, a power input 46, a first auxiliary port 48, and a second auxiliary port 50. Processor 24 may be electrically coupled with memory 25 such as flash upgradable memory storing instructions for processing by processor 24. As shown in FIG. 3, trailer control module 12 includes a housing 52 that contains processor 24. Brake supply pressure input 26, brake control pressure input 28, first wheel speed input 30, second wheel speed input 32, third wheel speed input 34, fourth wheel speed input 36, first valve output 38, second valve output 40, third valve output 42, CAN port 44, power input 46, first auxiliary port 48, and second auxiliary port 50 include external ports configured for releasable coupling with wire connectors to place the ports in electrical communication with external components as described below.

Brake control pressure input 28 is electrically coupled via a wire with a pressure sensor 53 (FIG. 1) that is threadably received by a port in brake valve 14. The pressure sensor 53 is operable to measure a brake control pressure within brake valve 14 and convert the measured brake control pressure into an electrical brake control pressure signal that is transmitted to brake control pressure input 28. The brake control pressure within brake valve 14 corresponds to the pressure supplied by brake valve 14 to service brake chambers 54 and 56 of brake actuators 58 and 60.

Brake supply pressure input 26 is electrically coupled via a wire with a pressure sensor 62 (FIG. 1) that is threadably received by a port in brake valve 14. The pressure sensor 62 is operable to measure a brake supply pressure within brake valve 14 and convert the measured brake supply pressure into an electrical brake supply pressure signal that is transmitted to brake supply pressure input 26. The brake supply pressure within brake valve 14 corresponds to the pressure supplied by brake valve 14 via an air reservoir (preferably located on a tractor and not shown) to emergency brake chambers 96 and 98 of brake actuators 58 and 60.

Figure 4:
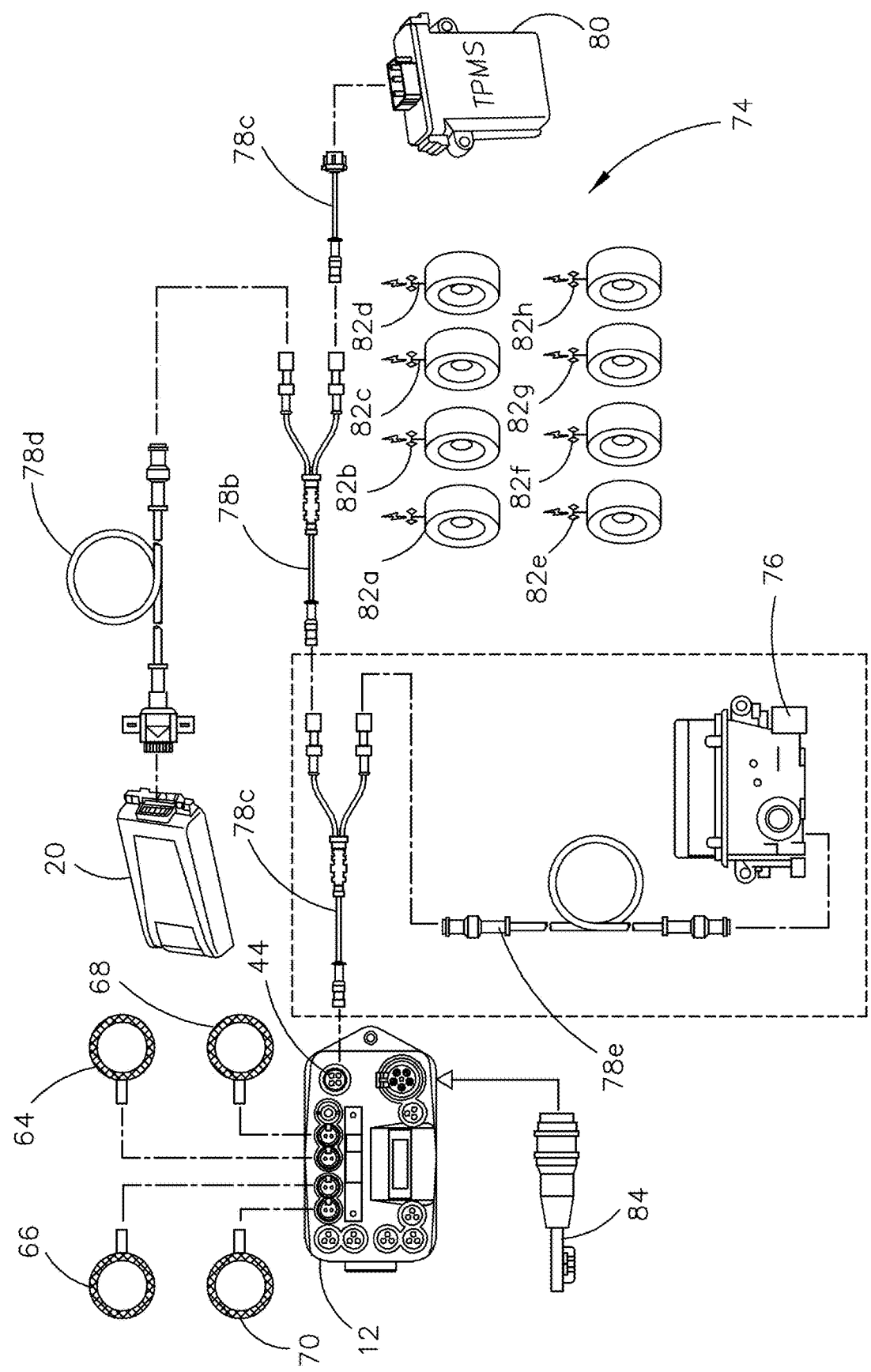
FIG. 4 is a schematic view showing components coupled to certain data ports of the trailer brake and monitoring system of FIG. 1.

First wheel speed input 30, second wheel speed input 32, third wheel speed input 34, and fourth wheel speed input 36 are electrically coupled respectively with a first wheel speed sensor 64, a second wheel speed sensor 66, a third wheel speed sensor 68, and a fourth wheel speed sensor 70, shown in FIG. 4. The first, second, third, and fourth wheel speed sensors 64, 66, 68, and 70 are each operable to detect the frequency of rotation and/or speed of a vehicle wheel and send a corresponding electrical wheel speed signal to the applicable first, second, third, or fourth wheel speed inputs 30, 32, 34, and 36.

First valve output 38 is electrically coupled via a wire with an anti-lock braking system ("ABS") 72 (FIG. 1) of brake valve 14. First valve output 38 is configured to send a brake signal to ABS 72 to control the operation of ABS 72. Second valve output 40 is configured to be electrically coupled with an ABS of a second brake valve 132 (FIGS. 8A-13D), and third valve output 42 is configured to be electrically coupled with an ABS of a third brake valve 134 (FIGS. 13A-13D). Second brake valve 132 and third brake valve 134 preferably have the same or similar configuration as brake valve 14 described herein.

Referring to FIG. 4, controller area network ("CAN") port 44 is electrically coupled to a communications device 20, a tire pressure and temperature monitoring system 74, and a stability module 76 via cables 78a-e. CAN port 44 is preferably SAE J1939 and ISO 11898 compatible and meets the CAN 2.0b extended frame standard. CAN port 44 operates as a data port that can send data from trailer control module 12 to external devices and receive data from the external devices. Communications device 20 is preferably a telematics unit that is in wireless communication with a central server 79 (FIG. 6). Tire pressure and temperature monitoring system 74 includes a communications module 80 that is in wireless communication with a plurality of tire sensors 82a-h. Stability module 76 preferably provides trailer roll over control and automatic braking. CAN port 44 may be electrically coupled to other devices such as a trailer lift axle control device that controls the position of lift axles during operation of a trailer (e.g., Haldex's ILAS® E trailer lift axle control system). CAN port 44 is preferably configured to include at least four separate electrical connections. Two of the electrical connections operate to receive and transmit data using differential signaling. Two of the electrical connections include a 12V power source and ground such that CAN port 44 can be used to power auxiliary components that are connected to the CAN port 44, such as the communications device 20, tire pressure and temperature monitoring system 74, and stability module 76. Processor 24 can preferably shut off power through the 12V power source of the CAN port 44 so that there is sufficient power for trailer control module 12 at critical moments, such as during a potential rollover or jackknife condition. CAN port 44 is preferably operable with diagnostic tools such as Haldex's Infocenter2, Haldex Diagnostics+, and Haldex Fleet+.

Power input 46 is electrically coupled to a cable 84 that provides power to trailer control module 12. Power input 46 is preferably configured for connection with a power line carrier ("PLC") protocol 7-way cable. Power input 46 preferably has the capability to both receive power from an external source for powering trailer control module 12 and act as a data port that sends data from trailer control module 12 to external devices and receives data from the external devices. For example, power input 46 may receive stoplight power (voltage) through PLC cable 84. Power input 46 and PLC cable 84 preferably receive signals and data from, and transmit signals and data to, a tractor to which a trailer having trailer brake and monitoring system 10 is coupled. Power input 46 and PLC cable 84 are preferably operable with diagnostic tools such as Haldex's PLC Infocenter, PLC PC Diagnostics, third party PLC diagnostic tools, and ABS fault lamp blink codes.

First auxiliary port 48 and second auxiliary port 50 are configured to be electrically coupled with auxiliary components such as those to measure tire pressure, tire inflation, tire temperature, brake temperature, brake stroke, the door switch, suspension pressure, tail fin deployment, power spring connection, steer axle lock, reverse detection, low reservoir, anti dock walk, lift axle, suspension dump, trailer roll stability, and hub odometer. First auxiliary port 48 and second auxiliary port 50 are preferably configured so that one of the first and second auxiliary ports 48, 50 is a switched input and the other of first and second auxiliary ports 48, 50 is a 12 Vdc output that is activated in response to a signal received at the switched input. For example, the first and second auxiliary ports 48 and 50 may act as an on/off switch to provide an action determined by pressures, temperature, power voltage and other inputs. First auxiliary port 48 and/or second auxiliary port 50 may control operation of a trailer lift axle control device that controls the position of lift axles during operation of a trailer (e.g., Haldex's ILAS® E trailer lift axle control system).

Brake valve 14 is preferably a full function ABS ("FFABS") valve, such as the Haldex FFABS valve or the valve disclosed in U.S. Pat. No. 5,722,740, which is hereby incorporated by reference herein. Brake valve 14 controls the flow of air to and from the brake actuators 58 and 60. Referring to FIG. 6, brake valve 14 includes a supply pressure inlet 86, a control pressure inlet 88, a service brake pressure outlet 90, and an emergency brake pressure outlet 92. Supply pressure inlet 86 is coupled via a gladhand 94 (FIG. 1) to a source of pressurized air, such as an air reservoir on a tractor to which is connected a trailer containing the trailer brake and monitoring system 10. Control pressure inlet 88 is coupled to booster valve 18, as described in more detail below. Service brake pressure outlet 90 is coupled with the service brake chambers 54 and 56 of brake actuators 58 and 60. Emergency brake pressure outlet 92 is coupled with the emergency brake chambers 96 and 98 of brake actuators 58 and 60. Air entering brake valve 14 through supply pressure inlet 86 is preferably routed in a conventional manner through the brake valve 14 to an air reservoir 100 (FIG. 2) mounted on a trailer and to emergency brake chambers 96 and 98, such as described in U.S. Pat. No. 5,722,740. Brake valve 14 preferably routs air from air reservoir 100 through service brake pressure outlet 90 when pressurized air is supplied to control pressure inlet 88 depending on the condition of ABS 72, as described in U.S. Pat. No. 5,722,740.

Reservoir purge valve 16 is preferably a purge valve, such as the Haldex Reservoir Purge Valve or the valve disclosed in U.S. Patent Application Publication No. 2017/0146137, which is hereby incorporated by reference herein. Reservoir purge valve 16 exhausts air and contaminants from air reservoir 100 when there is a loss of supply pressure at supply pressure inlet 86 (i.e., when the emergency brakes of brake actuators 58 and 60 are actuated). Reservoir purge valve 16 includes a control port 102 that is in fluid communication with the supply pressure inlet 86 of brake valve 14, a reservoir inlet port 104 that is in fluid communication with a port of air reservoir 100, and an exhaust port 106.

Booster valve 18 (FIG. 2) is preferably a booster or relay valve, such as a Haldex Relay Valve. Booster valve 18 has a service brake control inlet 108 that is in fluid communication with a service brake control line of a tractor via a gladhand 109, a supply inlet 110 that is in fluid communication with air reservoir 100, a service brake control outlet 112 that is in fluid communication with the control pressure inlet 88 of brake valve 14, and another service brake control outlet 114 that may be placed in fluid communication with a rear trailer via a gladhand 116. Preferably, when a driver of a tractor depresses a brake pedal, pressurized air from the tractor enters the service brake control inlet 108, which causes air from supply inlet 110 to exit booster valve 18 through service brake control outlet 112 and enter brake valve 14 through control pressure inlet 88.

Communications device 20 (FIG. 4) is preferably a telematics unit. Communications device 20 receives data from CAN port 44 and transmits the data to a central server 79 for storage or processing. Communications device 20 preferably wirelessly transmits the data to central server 79 where it can be stored, processed, and/or transmitted to other locations or devices. Communications device 20 may wirelessly transmit the data over a cellular data connection or a wireless internet connection. Communications device 20 may include a processor with the capability to process data received from CAN port 44.

Figure 2:
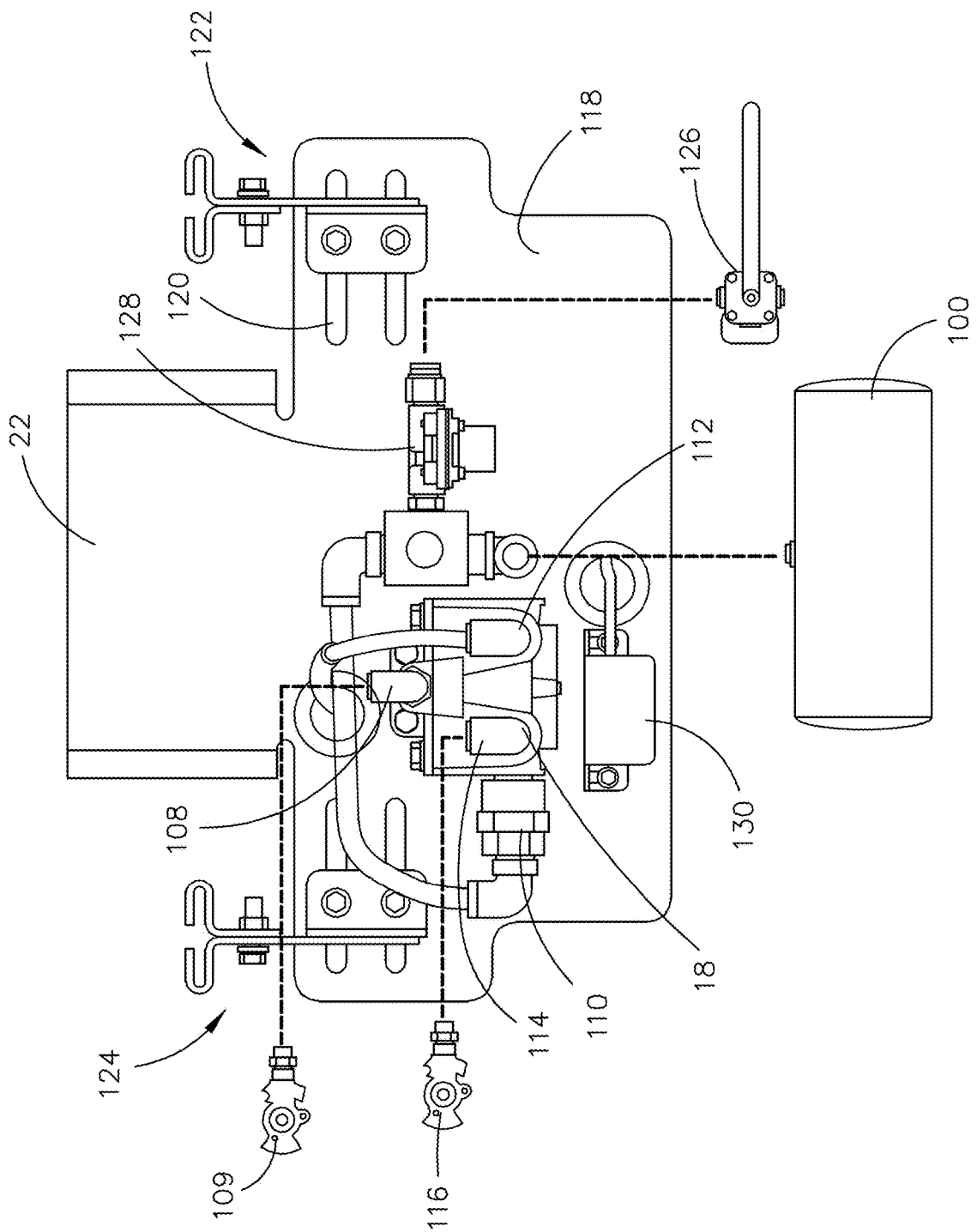
FIG. 2 is a rear elevational view of the trailer brake and monitoring system of FIG. 1.
Figure 14A:
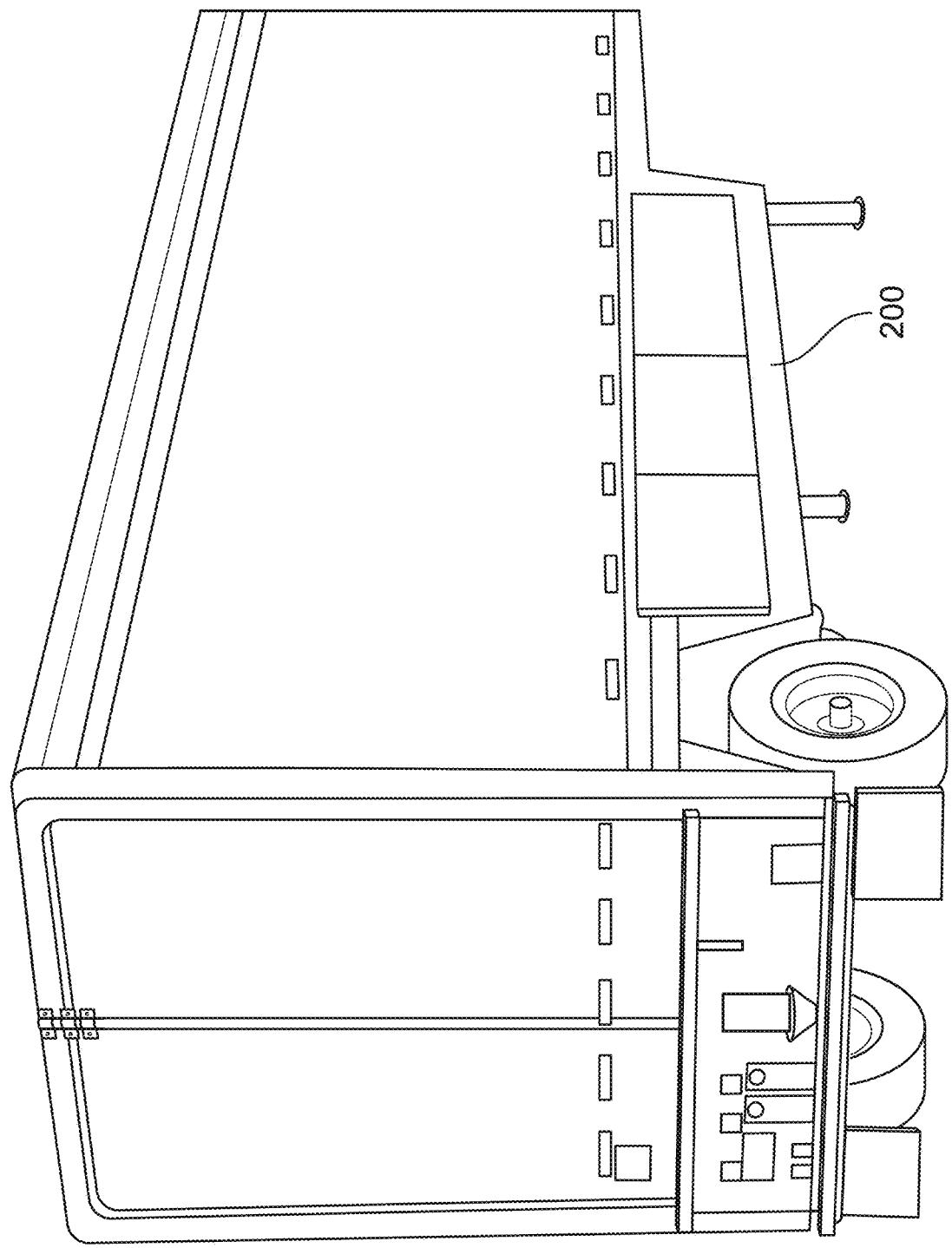
FIGS. 14A-14B show a preferred mounting location of the trailer brake and monitoring system of FIG. 1 for a drop deck trailer.
Figure 14B:
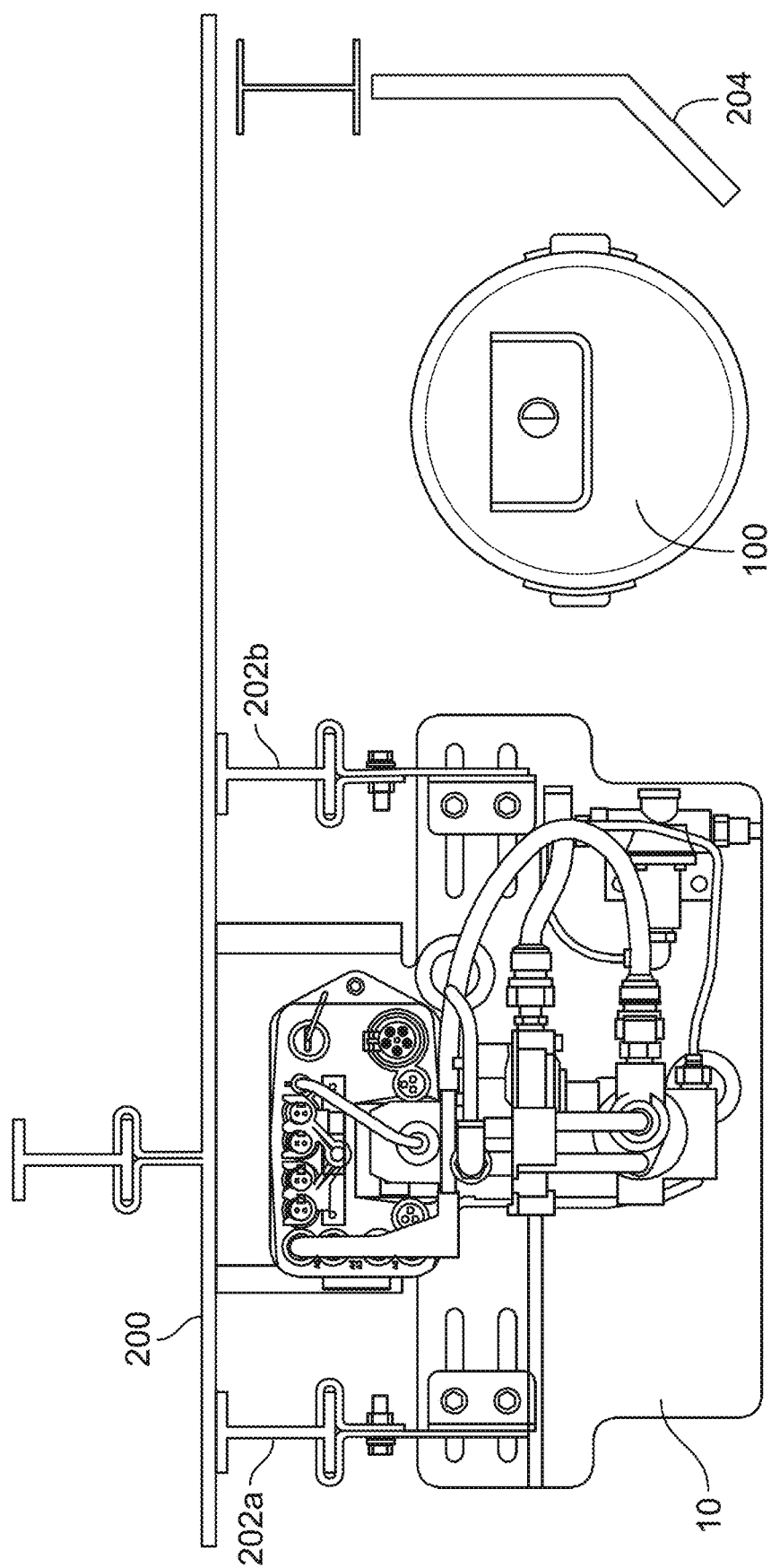

Mounting bracket 22 provides a mounting surface for mounting trailer control module 12, brake valve 14, reservoir purge valve 16, booster valve 18, and alarm 130. Trailer control module 12, brake valve 14, reservoir purge valve 16, booster valve 18, and alarm 130 may be removably or permanently mounted to mounting bracket 22. Referring to FIG. 2, mounting bracket 22 includes a mounting plate 118 to which the trailer control module 12, brake valve 14, reservoir purge valve 16, booster valve 18, and alarm 130 are mounted. Mounting plate 118 includes slots, one of which is identified as 120, that receive fasteners to adjustably mount clamp assemblies 122 and 124 to mounting plate 118. As shown in FIGS. 14A-14B, clamp assemblies 122 and 124 are configured to removably clamp to I-beams 202*a* and 202*b* of a trailer 200 for removably coupling mounting bracket 22 to the trailer 200. Mounting bracket 22 may be configured and function as described in U.S. Pat. No. 8,511,929 and/or U.S. Patent Application Publication No. 2011/0236128, each of which are hereby incorporated by reference herein. In the event of a failure of trailer brake and monitoring system 10, it may be replaced with a new trailer brake and monitoring system 10 by removably coupling the mounting bracket 22 of the old trailer brake and monitoring system 10 from engagement with the vehicle to which it is mounted and coupling the mounting bracket 22 of the new trailer brake and monitoring system 10 with the vehicle.

Figure 15A:
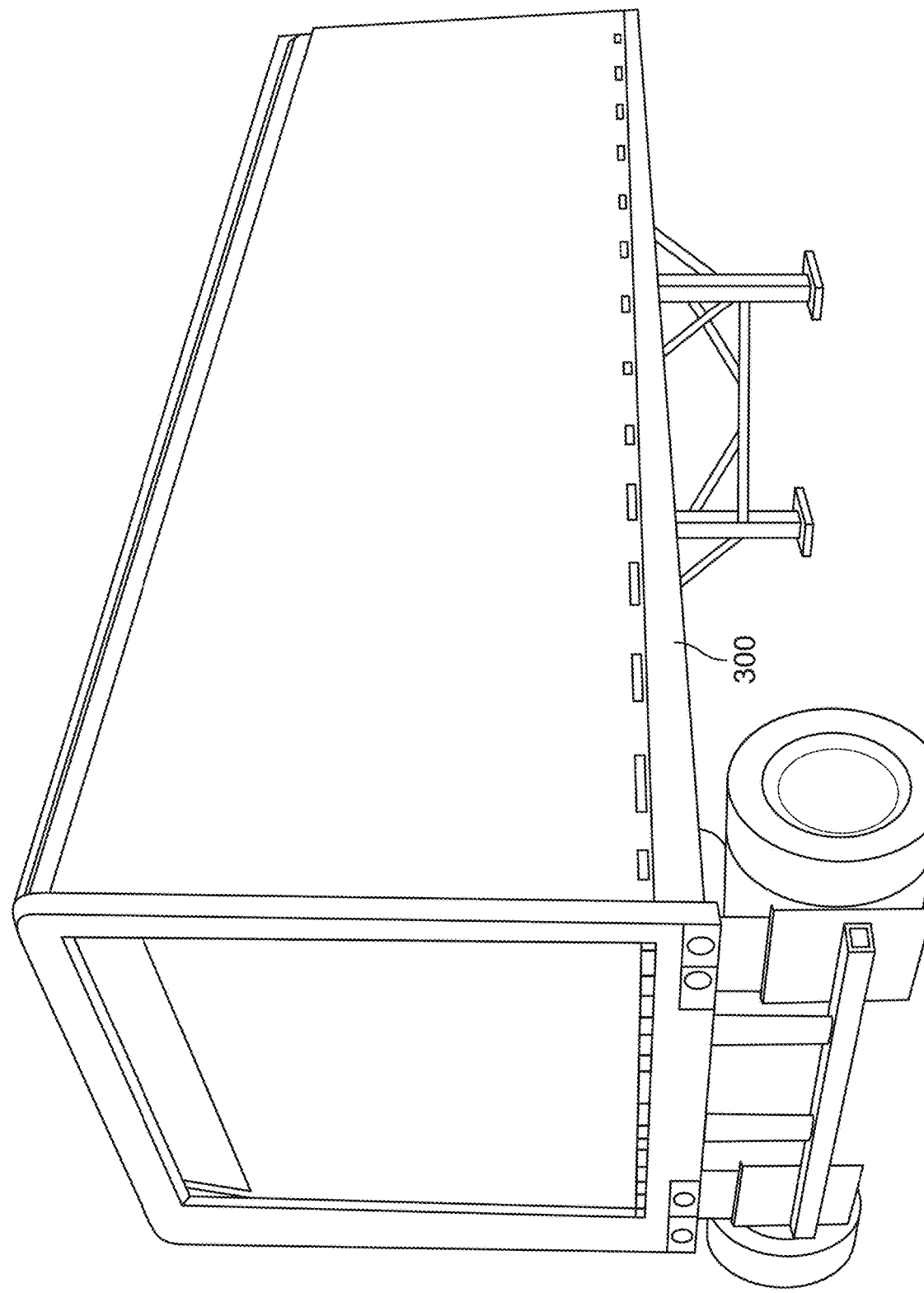
FIGS. 15A-15B show a preferred mounting location of the trailer brake and monitoring system of FIG. 1 for a straight rail trailer.
Figure 15B:
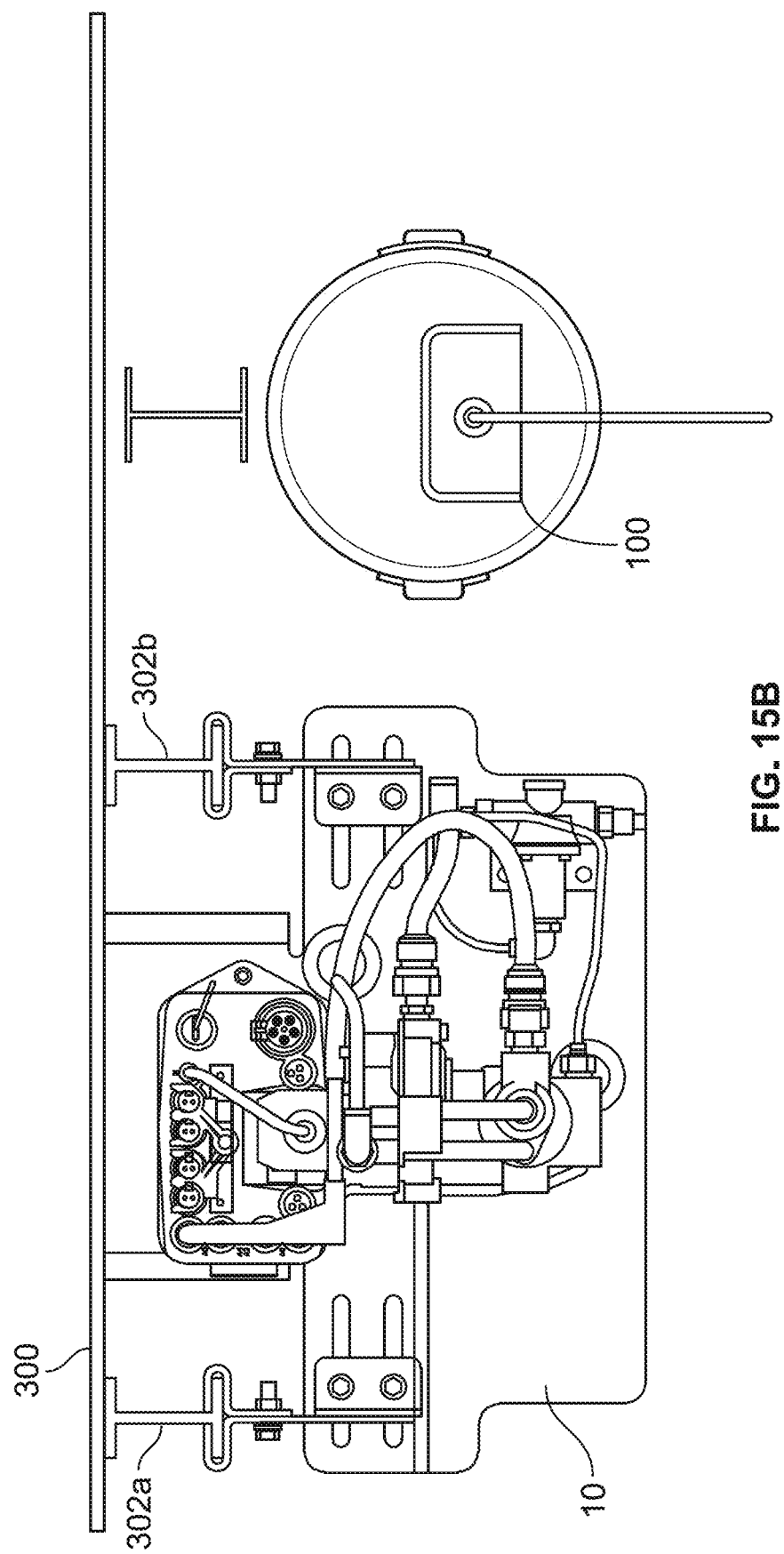

FIGS. 14A-14B show trailer brake and monitoring system 10 mounted to a drop deck trailer 200. In this configuration, trailer brake and monitoring system 10 is preferably positioned behind air reservoir 100, which is positioned behind a protective shield 204 mounted underneath the trailer 200 and extending downward toward the ground. FIGS. 15A-15B show trailer brake and monitoring system 10 mounted to a straight rail trailer 300. Clamp assemblies 122 and 124 removably clamp to I-beams 302*a* and 302*b* of trailer 300 for removably coupling mounting bracket 22 to the trailer 300. Trailer brake and monitoring system 10 is positioned behind air reservoir 100.

Figure 5:
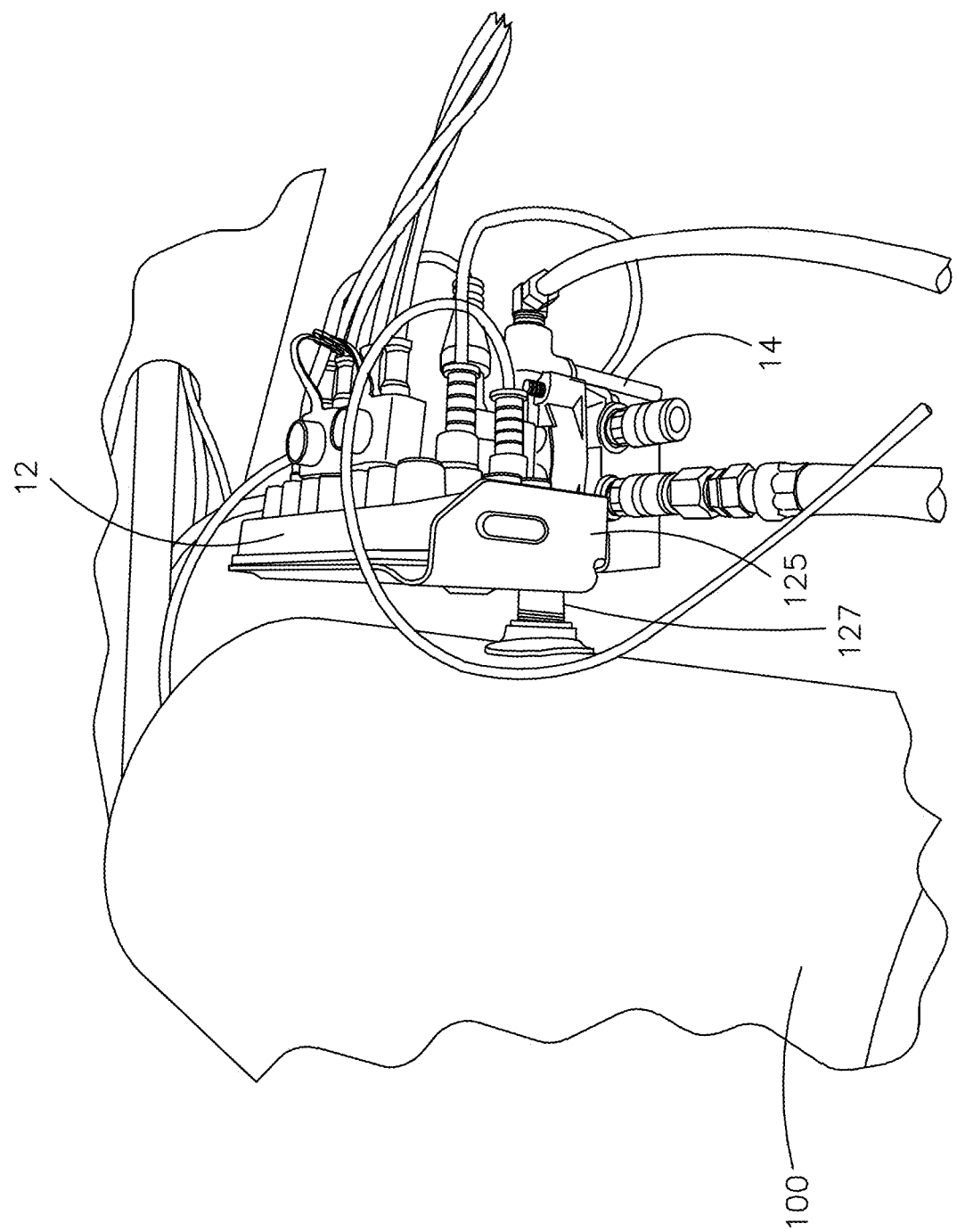
FIG. 5 is a perspective view showing the trailer control module of FIG. 3 mounted to an air reservoir tank.

An optional mounting of trailer control module 12 and brake valve 14 is shown in FIG. 5. Trailer control module 12 is mounted to brake valve 14 with a bracket 125. A threaded air reservoir port 127 of brake valve 14 engages a threaded opening of air reservoir 100 to mount trailer control module 12 and brake valve 14 to air reservoir 100. Air reservoir 100 is mounted to a vehicle in a conventional manner. With this mounting arrangement, reservoir purge valve 16, booster valve 18 and other components of trailer brake and monitoring system 10 may be mounted to the vehicle using mounting bracket 22 or as otherwise known in the art.

A height control valve 126 (FIG. 2) is placed in fluid communication with air reservoir 100 through a pressure protection valve 128. As is generally known in the art, height control valve 126 is mounted to a frame of a vehicle, such as a trailer, and includes a lever that is mounted to a movable suspension component of the vehicle, such as a trailing arm. As the trailing arm moves up, the height control valve 126 introduces air from the air reservoir into an air spring suspension of the vehicle to level the vehicle, and as the trailing arm moves down, the height control valve 126 exhausts air from the air spring suspension. The pressure protection valve 128 blocks the flow of air to height control valve 126 when the air pressure in air reservoir 100 drops below a predetermined level.

Trailer brake and monitoring system 10 also includes an alarm 130 that is electrically coupled via a wire with trailer control module 12. Alarm 130 preferably sounds an audible alarm to warn an operator of a particular condition sensed by trailer control module 12, as described in more detail below.

In operation, processor 24 (FIG. 6) receives a brake control pressure signal from brake control pressure input 28 and a brake supply pressure signal from brake supply pressure input 26. The brake control pressure signal corresponds to the pressure supplied by brake valve 14 to the service brake chambers 54 and 56 (FIG. 1) of brake actuators 58 and 60, and the brake supply pressure signal corresponds to the pressure supplied by brake valve 14 to the emergency brake chambers 96 and 98 of brake actuators 58 and 60.

Processor 24 compares the brake control pressure signal to a predefined brake control pressure range, which may be stored in memory 25 coupled with processor 24. If the brake control pressure signal is not within the predefined brake control pressure range (e.g., the brake control pressure signal indicates that the brake control pressure is too high or too low for the present condition of trailer brake and monitoring system 10), processor 24 generates and sends a first warning signal to CAN port 44 and power input 46. The first warning signal is sent from CAN port 44 to communications device 20, which wirelessly sends the first warning signal to central server 79. Power input 46 may send the first warning signal to a display panel or alarm in the cab of the tractor to notify the driver of a potentially unsafe operating condition. The first warning signal may also be sent to alarm 130 for sounding an audible alarm.

Processor 24 compares the brake supply pressure signal to a predefined brake supply pressure range, which may be stored in memory 25 coupled with processor 24. If the brake supply pressure signal is not within the predefined brake supply pressure range (e.g., the brake supply pressure signal indicates that the brake supply pressure is too high or too low for the present condition of trailer brake and monitoring system 10), processor 24 generates and sends a second warning signal to CAN port 44 and power input 46. The second warning signal is sent from CAN port 44 to communications device 20, which wirelessly sends the second warning signal to central server 79. Power input 46 may send the second warning signal to a display panel or alarm in the cab of the tractor to notify the driver of a potentially unsafe operating condition. The second warning signal may also be sent to alarm 130 for sounding an audible alarm.

Central server 79 preferably stores the occurrence of any first and second warning signals and any corresponding data relating to the brake control pressure signal and/or brake supply pressure signal causing the warning signal. Central server 79 preferably also receives and stores a history over time of the brake control pressure signal and brake supply pressure signal from CAN port 44 and may perform the steps of comparing the brake control pressure signal with a brake control pressure range, comparing the brake supply pressure signal with a brake supply pressure range, generating a first warning signal if the brake control pressure signal is not within the brake control pressure range, and generating a second warning signal if the brake supply pressure signal is not within the brake supply pressure range. Central server 79 preferably sends a notification, such as an e-mail or a text message, to a fleet service operator to notify them of a potential error condition with the vehicle on which trailer brake and monitoring system 10 is installed. The fleet service operator may also have access to the data stored in central server 79 via a web portal or other software that notifies the fleet service operator when a first or second warning signal is generated or received by central server 79.

Processor 24 receives a first wheel speed signal from the first wheel speed input 30, a second wheel speed signal from the second wheel speed input 32, a third wheel speed signal from the third wheel speed input 34, and a fourth wheel speed signal from the fourth wheel speed input 36. Processor 24 is configured to send a first brake signal to the first valve output 38 and to ABS 72 of brake valve 14 based on at least one of the first wheel speed signal and the second wheel speed signal. The first brake signal activates or deactivates ABS 72 based on the first wheel speed signal and/or second wheel speed signal. The brake valve 14 controls braking of at least one of the wheels whose speed is sensed by the first wheel speed sensor 64 and the second wheel speed sensor 66. For example, if the wheel corresponding with first wheel speed input 30 and/or second wheel speed input 32 begins to skid, the first brake signal may activate ABS 72 to stop the wheel(s) from skidding.

Processor 24 is configured to send a second brake signal to second valve output 40 and an ABS of second brake valve 132 (FIGS. 8A-13D) based on at least one of the first wheel speed signal, second wheel speed signal, third wheel speed signal and the fourth wheel speed signal. The second brake signal activates or deactivates the ABS of the second brake valve 132 based on the first wheel speed signal, second wheel speed signal, third wheel speed signal and/or the fourth wheel speed signal. The second brake valve 132 controls braking of at least one of the wheels whose speed is sensed by the third wheel speed sensor 68 and the fourth wheel speed sensor 70.

Processor 24 is configured to send a third brake signal to the third valve output 42 and an ABS of a third brake valve 134 (FIGS. 13A-13D) based on at least one of the third wheel speed signal and the fourth wheel speed signal. The third brake signal activates or deactivates the ABS of the third brake valve 134 based on the third wheel speed signal and/or the fourth wheel speed signal. The third brake valve 134 controls braking of at least one of the wheels whose speed is sensed by the third wheel speed sensor 68 and the fourth wheel speed sensor 70.

FIGS. 7A-13D show exemplary embodiments of configurations of first, second, third, and fourth wheel speed sensors 64, 66, 68, and 70 and of brake valve 14, second brake valve 132, and third brake valve 134 for different types of vehicles and setups.

Figures 7A, 7B, 7C, 7D, 7E:
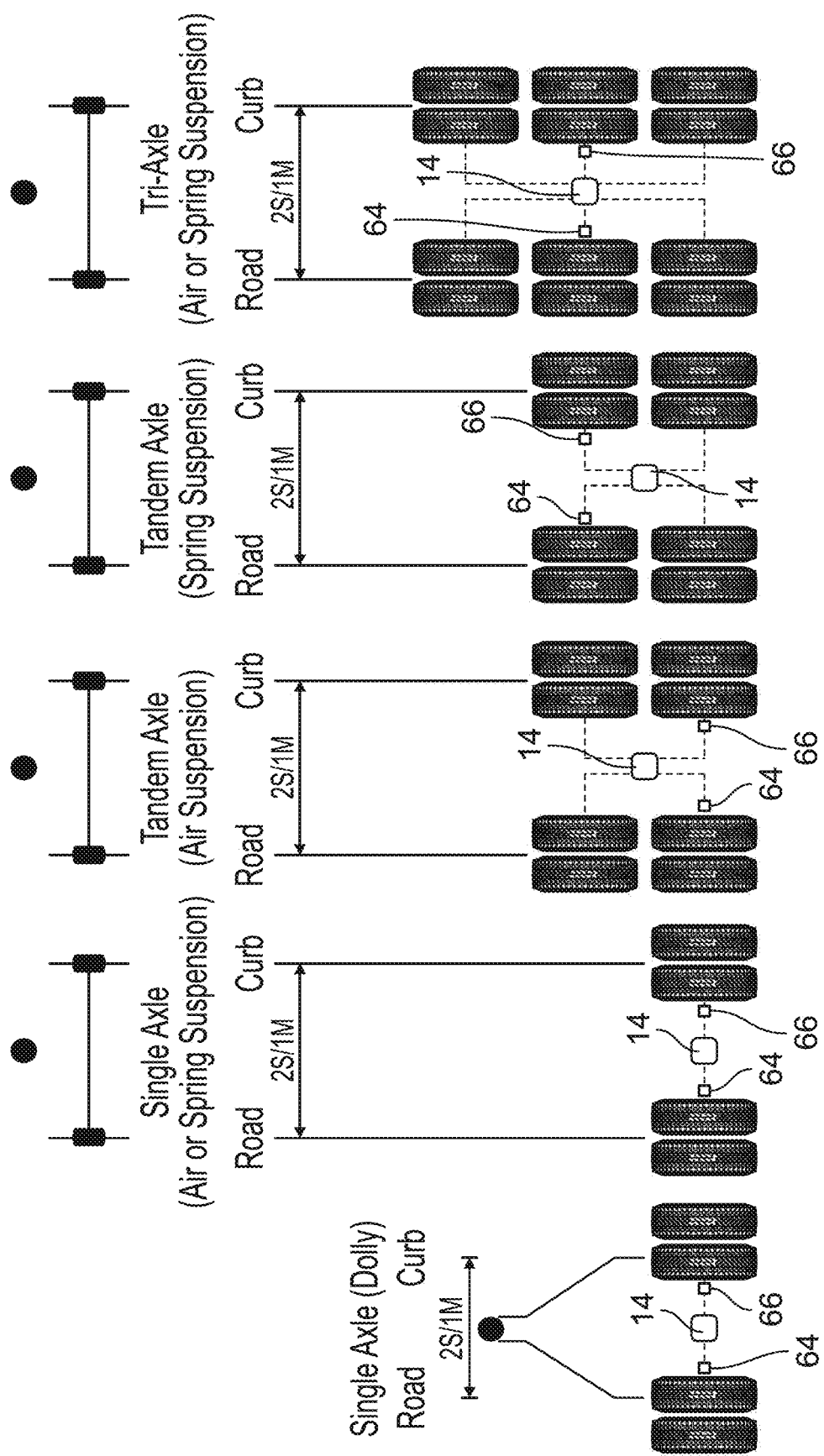
FIGS. 7A-7E show 2S/1M configurations of the trailer brake and monitoring system of FIG. 1 for different types of single or multi-axle trailer configurations.

FIGS. 7A-7E show 2S ("sensor")/1M ("modulator" or brake valve) configurations of trailer brake and monitoring system 10 for five different types of single or multi-axle trailer configurations: a single axle (dolly) (FIG. 7A), a single axle (air or spring suspension) (FIG. 7B), a tandem axle (air suspension) (FIG. 7C), a tandem axle (spring suspension) (FIG. 7D), and a tri-axle (air or spring suspension) (FIG. 7E). Positions of first and second wheel speed sensors 64 and 66 and of brake valve 14 are indicated in FIGS. 7A-7E for the different configurations. In these configurations, third and fourth wheel speed sensors 68 and 70 and second and third valve outputs 40 and 42 are not used. In each configuration shown in FIGS. 7A-7E, the brake valve 14 controls the operation of the braking assemblies on both sides of the vehicle.

FIGS. 8A-8D show 2S/2M configurations of trailer brake and monitoring system 10 for four different types of multi-axle trailer configurations: a single axle (air or spring suspension) (FIG. 8A), a tandem axle (spring suspension) (FIG. 8B), a tandem axle (air suspension) (FIG. 8C), and a tri-axle (air or spring suspension) (FIG. 8D). Positions of first and second wheel speed sensors 64 and 66, of brake valve 14, and of second brake valve 132 are indicated in FIGS. 8A-8D for the different configurations. In these configurations, third and fourth wheel speed sensors 68 and 70 and third valve output 42 are not used. In each configuration shown in FIGS. 8A-8D, the brake valve 14 controls the operation of the braking assemblies on one side of the vehicle, and the second brake valve 132 controls the operation of the braking assemblies on the other side of the vehicle.

FIGS. 9A-9D show 4S/2M configurations of trailer brake and monitoring system 10 for four different types of multi-axle trailer configurations: a tandem axle (air or spring suspension) (FIG. 9A), a tri-axle (air or spring suspension) (FIG. 9B), a quad-axle (air suspension) (FIG. 9C), and a quad-axle (spring suspension) (FIG. 9D). Positions of first, second, third, and fourth wheel speed sensors 64, 66, 68, and 70, of brake valve 14, and of second brake valve 132 are indicated in FIGS. 9A-9D for the different configurations. In these configurations, third valve output 42 is not used. In each configuration shown in FIGS. 9A-9D, the brake valve 14 controls the operation of the braking assemblies on one side of the vehicle, and the second brake valve 132 controls the operation of the braking assemblies on the other side of the vehicle.

FIGS. 10A-10C show 4S/2M configurations of trailer brake and monitoring system 10 for three different types of multi-axle trailer with lift axle(s) configurations: a tandem axle (FIG. 10A), a tri-axle (FIG. 10B), and a quad-axle (FIG. 10C). Positions of first, second, third, and fourth wheel speed sensors 64, 66, 68, and 70, of brake valve 14, and of second brake valve 132 are indicated in FIGS. 10A-10C for the different configurations. In these configurations, third valve output 42 is not used. In each configuration shown in FIGS. 10A-10C, the brake valve 14 controls the operation of the braking assemblies on one side of the vehicle, and the second brake valve 132 controls the operation of the braking assemblies on the other side of the vehicle.

FIGS. 11A-11E show 4S/2M configurations of trailer brake and monitoring system 10 for five different types of multi-axle trailer configurations, as recommended for spread axle applications: a tandem axle (air or spring suspension) (FIG. 11A), a tri-axle (air or spring suspension) (FIG. 11B), a quad-axle (air suspension) (FIG. 11C), a quad-axle (spring suspension) (FIG. 11D), and a full trailer (air or spring suspension) (FIG. 11E). Positions of first, second, third, and fourth wheel speed sensors 64, 66, 68, and 70, of brake valve 14, and of second brake valve 132 are indicated in FIGS. 11A-11E for the different configurations. In these configurations, third valve output 42 is not used. In each configuration shown in FIGS. 11A-11E, the brake valve 14 controls the operation of the braking assemblies for one or more axles on both sides of the vehicle, and the second brake valve 132 controls the operation of the braking assemblies for one or more axles on both sides of the vehicle.

FIGS. 12A-12C show 4S/2M configurations of trailer brake and monitoring system 10 for three different types of multi-axle trailer with lift axle(s) configurations, as recommended for spread axle applications: a tandem axle (FIG. 12A), a tri-axle (FIG. 12B), and a quad-axle (FIG. 12C). Positions of first, second, third, and fourth wheel speed sensors 64, 66, 68, and 70, of brake valve 14, and of second brake valve 132 are indicated in FIGS. 12A-12C for the different configurations. In these configurations, third valve output 42 is not used. In each configuration shown in FIGS. 12A-12C, the brake valve 14 controls the operation of the braking assemblies for one or more axles on both sides of the vehicle, and the second brake valve 132 controls the operation of the braking assemblies for one or more axles on both sides of the vehicle.

FIGS. 13A-13D shows 4S/3M configurations of trailer brake and monitoring system 10 for four different types of full and semi-trailer configurations: a full trailer (air suspension) (FIG. 13A), a full trailer (air or spring suspension) (FIG. 13B), a semi-trailer tandem axle (air or spring suspension) (FIG. 13C), and a semi-trailer tri-axle (air suspension) (FIG. 13D). Positions of first, second, third, and fourth wheel speed sensors 64, 66, 68, and 70, of brake valve 14, of second brake valve 132, and of third brake valve 134 are indicated in FIGS. 13A-13D for the different configurations. In each configuration shown in FIGS. 13A-13D, the brake valve 14 controls the operation of certain braking assemblies on one side of the vehicle, the second brake valve 132 controls the operation of certain braking assemblies on the other side of the vehicle, and the third brake valve 134 controls the operation of braking assemblies for an axle on both sides of the vehicle.

Referring to FIG. 6, processor 24 may monitor stoplight power (voltage) provided to power input 46 through PLC cable 84 and compare that measured value to the brake control pressure signal from brake control pressure input 28. If the actual measured value differs from or exceeds a maximum allowable deviation (for example, if the brake control pressure signal indicates that the service brakes of the vehicle are being applied but the stoplight power voltage indicates that power is not being supplied to the brake lights), processor 24 may generate and send a warning signal to CAN port 44, power input 46, and alarm 130 in a similar manner as described above with respect to the first and second warning signals.

Processor 24 may receive data through CAN port 44, power input 46, and/or first and second auxiliary ports 48 and 50 corresponding to: tire pressure, tire inflation, tire temperature, brake temperature, brake stroke, the door switch, suspension pressure, tail fin deployment, power spring connection, steer axle lock, reverse detection, low reservoir, anti dock walk, lift axle, suspension dump, trailer roll stability, and hub odometer. Processor 24 may compare the data to a predefined set-point or ranges for such data and/or to other data received by processor 24 to determine if an error condition exists. If an error condition exists, processor 24 may generate and send a warning signal to CAN port 44, power input 46, and alarm 130 in a similar manner as described above with respect to the first and second warning signals. Further, the warning signal may be transmitted to communications device 20 and central server 79, as described above. Exemplary types of warning signals that may be generated by processor 24 are described below.

Processor 24 may generate a brake drag warning signal in the event that a low-pressure situation is detected (e.g., a known pressure range may allow a brake system to still function but will be known to cause brake drag) within a range of pressures. It is contemplated that a brake drag warning signal may be transmitted to a user/driver in the cab of the tractor-trailer through power input 46 and PLC cable 84 or may also be transmitted to central server 79 through CAN port 44.

Additional warning signals that may be generated by processor 24 include an incorrect connection warning signal, a closed service/control valve warning signal, a closed emergency/supply warning signal, no stoplight power warning signal, and an ABS warning signal. As the brake system is serviced and/or repaired, it is possible to reconnect the various pressure lines incorrectly. By measuring the brake control pressure and brake supply pressure, processor 24 is able to determine if a pressure line(s) is incorrectly connected to the brake valve 14. It is further contemplated that the position of the brake valve 14 may be measured and this data and/or information may be transmitted to processor 24 through first valve output 38 such that a warning or alarm may be generated in the event the brake valve 14 fails to actuate as designed. All of these indications may be generated/transmitted as described above.

Additional parameters that may be monitored by processor 24 and that may form the basis for a warning signal or indication include: tire pressure, tire inflation, tire temperature, brake temperature, brake stroke, door (ajar), suspension pressure, tail fin deployment, power spring condition, steer axle lock, reverse detection, low reservoir, anti dock walk, lift axle and suspension dump. The indication may be provided as an alarm, a warning lamp, a wireless message, a signal, or any combination thereof.

Failure of one or more tires on a tractor-trailer can be very dangerous. This is complicated by the fact that a tire may catastrophically fail with little or no warning or a tire may fail (e.g. on the trailer) and the operator does not become aware of the failure until much later. The tire pressure, tire inflation and tire temperature are all indications to the operator providing data relating to the status of the tires on the tractor-trailer allowing the operator to take quick action in the event of a failure. The information can also allow the operator to address any problems with the tires relatively early so as to avoid catastrophic failure on the road. The devices used to measure the above parameters may comprise any of the standard measurement devices.

The brake temperature and brake stroke are indications that provide warnings if the temperature of the brakes rises above a threshold level or if the measured stroke of the brake indicates excessive wear. The safe operation of the braking system in a tractor-trailer is critical. In the event that the braking system gets too hot, an indication may be generated so that the braking system can be inspected and/or serviced as necessary to ensure proper functionality. The brake stroke indication can be generated by a linear location measurement that can provide a service needed alert.

The door (ajar) indication may comprise, for example, a switch that indicates whether the door on the trailer is fully closed or not. It is understood that the switch may be programmable as either a normally closed or normally open switch.

The suspension pressure indication relates to a pressure measurement to ensure that the air pressure in the suspension system does not exceed a defined threshold. This threshold can be either a high limit or a low limit or both. The measurement device could comprise any of a transducer, a pressure switch or a sensor.

Tail fin deployment may comprise an indication generated by a switch as described in connection with the door (ajar) indication. This would alert the operator that the tail fin was in a deployed position so that it could be retracted properly prior to operating the vehicle.

With respect to the power spring condition indication, fractures or catastrophic failure of the power spring due to, for example, corrosion or wearing of the device can be very dangerous. To avoid this, a measurement that indicates that the power spring may be damaged or wearing can be obtained by a linear location measurement or measuring a "home" location for the power spring. If the power spring begins to wear, the power spring will not return to the original or "home" location that it originally started from when installed. Alternatively, the measurement could comprise a continuity measurement.

The steer axle lock is a function that locks the steering axle once the vehicle reaches a certain speed. At relatively low speed, the steer axle functionality provides the operator of the vehicle with greater maneuverability; however, such functionality is not safe at higher speeds. Accordingly, the steering axle may automatically lock at a desired vehicle speed, which may be fully programmable. The indication provides the monitoring device with information that the lock has engaged.

The reverse detection indication can be used to actuate various devices on the trailer such as a back-up alarm (audible sound) or reverse lights, etc. The measurement device providing the indication may in one embodiment comprise a Hall Effect switch.

It is important to receive information relating to the pressure in the primary air reservoir that provides pressurized air to the suspension system and the air brake system. A low reservoir indication may be generated by pressure measurement that may comprise any known type of pressure sensor or switch.

An anti dock walk indication provides a warning to the operator that the anti dock walk system is engaged and must be disengaged prior to operation of the vehicle.

The lift axle provides the operator with an indication that the lift axle should be in the down position. The axle in a tractor-trailer may set in either an up or down position, however, when the trailer is loaded the axle should be set in the down position. This indication will alert the operator to lower the axle if the weight of the trailer exceeds a threshold value. This threshold may be completely programmable.

The suspension dump provides an indication that the air in the suspension system has been rapidly exhausted from the air bags. Due to the fact that the axles of the tractor-trailer are relatively far apart (variable based on the length of the vehicle), when the vehicle makes a sharp turn the tires on the trailer axles have a tendency to be dragged sideways rather than rolling forward. This dragging severely wears the tires leading to premature failure. However, if the air in the suspension system is dumped in one of the axles (e.g., the forward axle of the two rear axles on the trailer), this allows for less wearing of the tires.

All or some of the data may be transmitted as data to central server 79 where historical data may be accumulated for each vehicle. In this manner, trends may be followed and maintenance could be anticipated/scheduled according to the vehicle's historical data prior to failure of device(s) and/or system(s). It is also contemplated that control for a backup alarm may be provided such that a backup indicated is generated and transmitted. In one embodiment, different transmission paths for the indication and backup indication may be used to ensure delivery of the indication. The system could utilize two wired transmission paths, or wireless transmission, or power line connection as desired to ensure reliable transmission. It is understood that the transmission method can be selected based on the application.

Brake Monitoring System with Temperature Monitoring

Trailer brake and monitoring system 10 is one exemplary embodiment of a brake monitoring system that monitors wheel end temperatures and brake conditions to determine whether there is a potential for overheating and fire at one of the wheel ends. The brake monitoring system includes a control module (e.g., trailer control module 12 (FIG. 4)), wheel end temperature sensors (e.g., tire sensors 82a-h), and an alarm system (e.g., alarm 130 (FIG. 2)). The wheel end temperature sensors are operable to measure the wheel end temperature of a wheel end, and the wheel end temperature sensors are electrically coupled to the CAN port 44 of the control module. Each wheel end temperature sensor may generate a wheel end temperature signal in an SAE J1939 format, and send the wheel end temperature signal to the CAN port 44. The wheel end temperature sensors may be any type of sensor configured to measure temperature at a wheel end, including, but not limited to a tire temperature sensor, a wheel bearing temperature sensor, and a brake actuator temperature sensor.

As described above, brake valve 14 (FIG. 1) supplies air at a brake supply pressure through an emergency brake pressure outlet 92 and air at a brake control pressure through a service brake pressure outlet 90. Pressure sensor 53, described above, measures the brake control pressure and generates a brake control pressure signal based on the brake control pressure, and pressure sensor 62, described above, measures the brake supply pressure, and generates a brake supply pressure signal based on the brake supply pressure. Processor 24 (FIG. 6) receives the brake supply pressure signal and determines the brake supply pressure corresponding to the brake supply pressure signal, and processor 24 receives the brake control pressure signal and determines the brake control pressure corresponding to the brake control pressure signal. Processor 24 also receives a user configurable: (1) brake supply pressure threshold that is approximately equal to a minimum brake supply pressure level that is necessary to disengage a spring or emergency brake of one of brake actuators 58 and 60 (FIG. 1); (2) first brake control pressure threshold that is approximately equal to a level of pressure necessary to begin applying a service brake of one of brake actuators 58 and 60; and (3) second brake control pressure threshold that is approximately equal to a level of pressure necessary to begin applying a service brake of one of brake actuators 58 and 60. The first and second brake control pressure thresholds may be approximately equal and between approximately 0 to 4 psi.

As described above, power input 46 (FIG. 3) of trailer control module 12 is configured for connection with a power line carrier ("PLC") cable 84 (FIG. 1). Power input 46 is configured to receive a stop lamp power signal from the PLC cable 84, and the power input 46 is configured to send the stop lamp power signal to the processor 24. The stop lamp power signal may be generated by a tractor control system when a driver presses a brake pedal or otherwise applies the vehicle's brakes.

The processor 24 of trailer control module 12 is configured to receive a configurable wheel end temperature threshold from a user; extract wheel end temperatures from the wheel end temperature signals received from the wheel end temperature sensors 82a-h; compare the wheel end temperatures to the wheel end temperature threshold; generate a brake monitoring signal when at least one of the following brake monitoring conditions has occurred: (i) the brake supply pressure is less than the brake supply pressure threshold; (ii) the brake control pressure is greater than the first brake control pressure threshold and the stop lamp power signal is not present; or (iii) the stop lamp power signal is present and the brake control pressure is not greater than the second brake control pressure threshold; and generate a wheel monitoring signal if a brake monitoring signal is generated when at least one of the wheel end temperatures is greater than the wheel end temperature threshold. The processor 24 may continuously monitor the wheel end temperatures, the brake supply pressure, the brake control pressure, and for the presence of a stop lamp power signal and carry out the above described steps.

As described above, the alarm 130 is electrically coupled to the control module 12. The processor 24 may send the wheel monitoring signal to the alarm 130, and the alarm 130 may generate at least one of a visible alarm or an audible alarm when it receives the wheel monitoring signal. Alarm 130 or a separate alarm may also be mounted in a tractor of the vehicle where it is visually and/or audibly observable by the driver of the vehicle.

Processor 24 may also monitor wheel slip by comparing wheel speeds detected by wheel speed sensors 64, 66, 68, and 70. If processor 24 detects wheel slip at one of the wheel ends, processor 24 may use the wheel slip condition as a factor in determining whether to generate the wheel monitoring signal. For example, detection of a wheel slip condition may be substituted for the brake monitoring conditions described above such that the wheel monitoring signal is generated when wheel slip occurs at a wheel end and the wheel end temperature at that wheel end is greater than the wheel end temperature threshold. Further, processor 24 may generate the wheel monitoring signal when the brake monitoring signal is generated, wheel slip occurs at a wheel end, and the wheel end temperature at that wheel end is greater than the wheel end temperature threshold.

The invention also encompasses a method for monitoring a wheel system comprising: comparing a wheel end temperature to a wheel end temperature threshold; generating a brake monitoring signal when at least one of the following brake monitoring conditions has occurred: (i) a brake supply pressure is less than a brake supply pressure threshold; (ii) a brake control pressure is greater than a first brake control pressure threshold and a stop lamp power signal is not present; or (iii) the stop lamp power signal is present and the brake control pressure is not greater than a second brake control pressure threshold; and generating a wheel monitoring signal if a brake monitoring signal is generated when the wheel end temperature is greater than the wheel end temperature threshold.

Figure 16A:
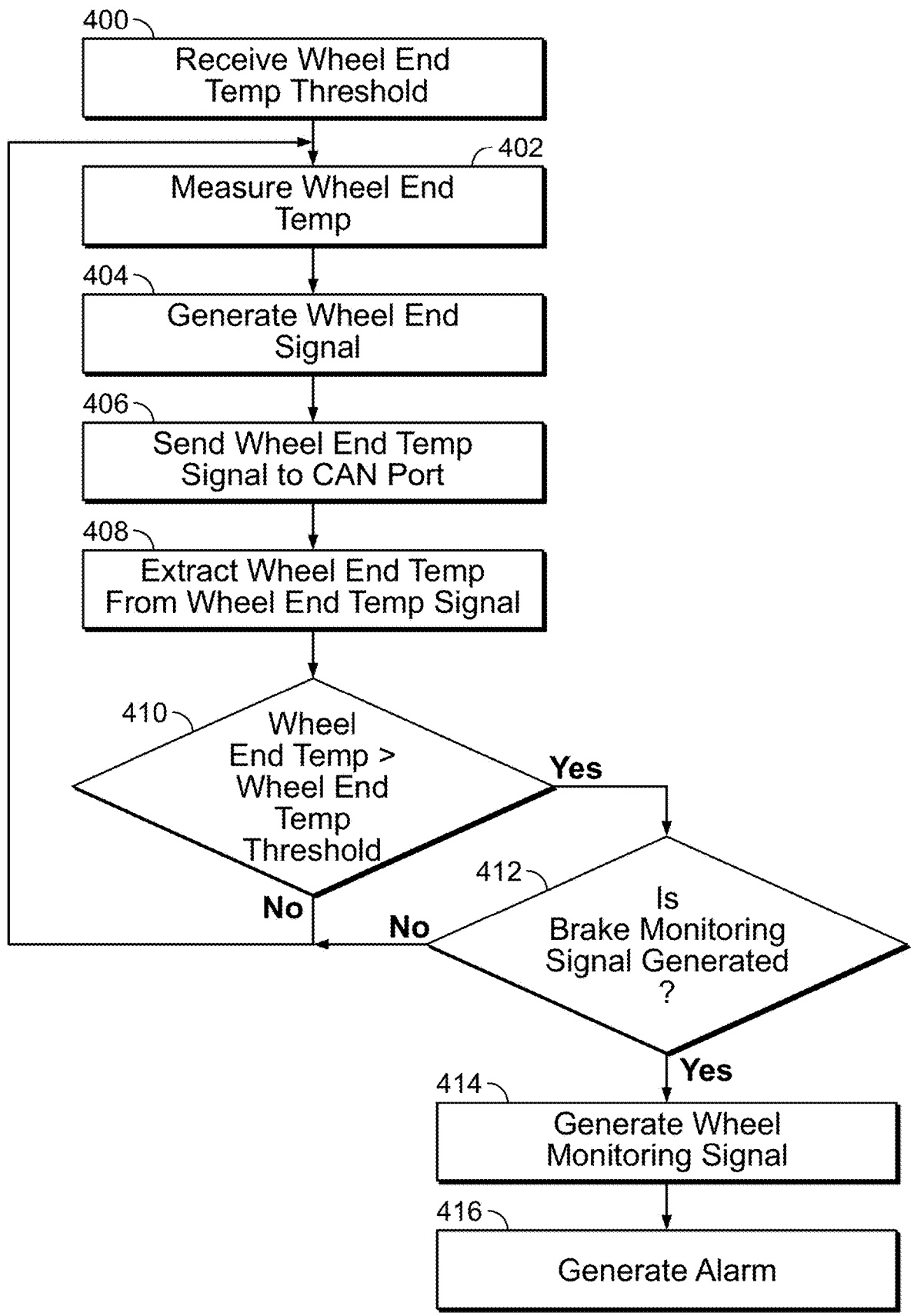
FIGS. 16A-16B are a flow chart showing a method for monitoring a wheel system.
Figure 16B:
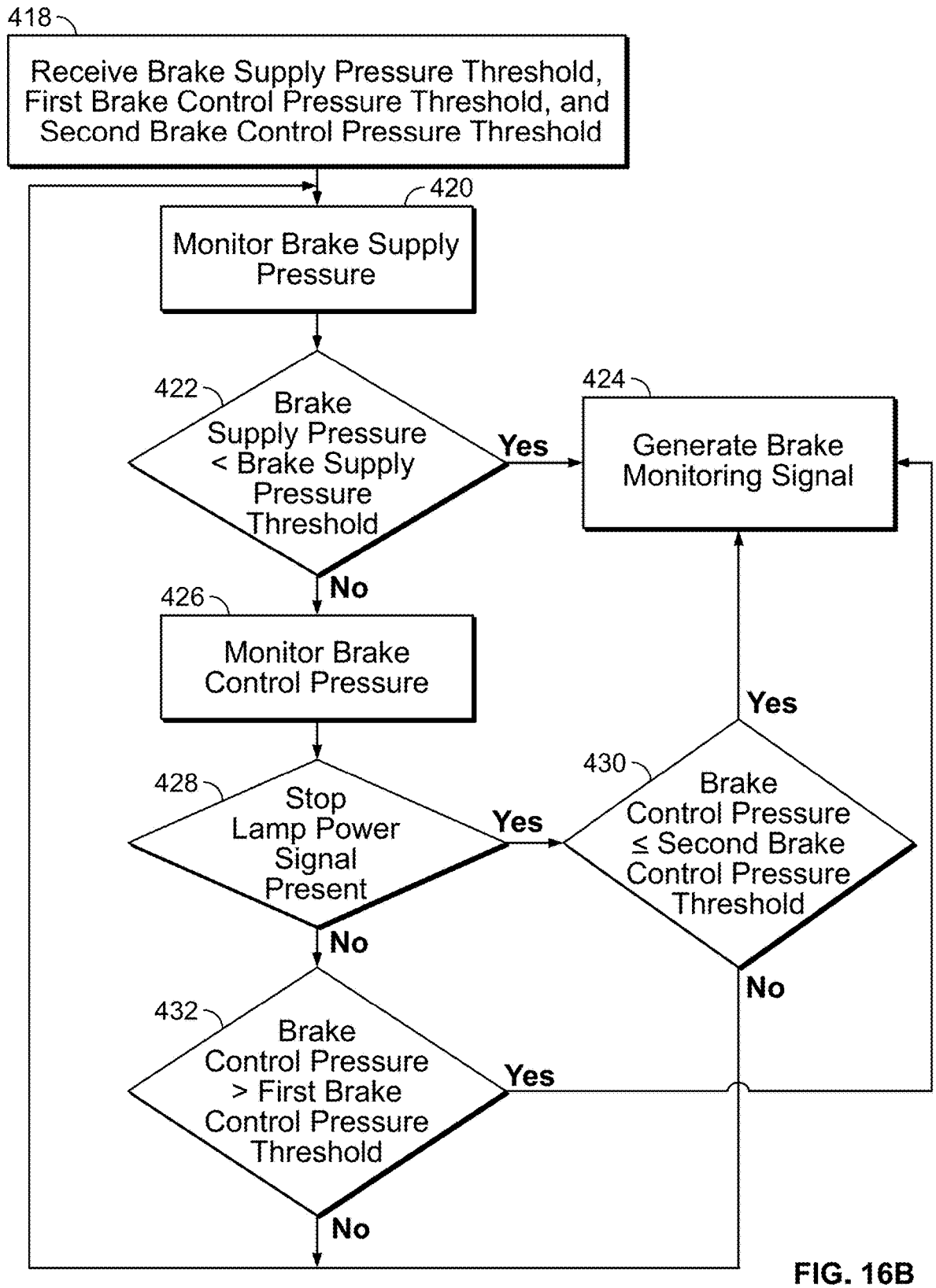

FIGS. 16A-16B show an exemplary method for monitoring a wheel system. At step 400, a wheel end temperature threshold is received. The wheel end temperature threshold may be received from a user by the processor 24 and stored in memory 25 (FIG. 6). The wheel end temperature threshold may be user configurable.

At step 402, a wheel end temperature is measured. For example, a wheel end temperature sensor, such as tire sensors 82a-h, may measure the wheel end temperature. At step 404, a wheel end temperature signal is generated. For example, the wheel end temperature sensor may generate a wheel end temperature signal based on the wheel end temperature measured. The wheel end temperature signal may be in an SAE J1939 format. At step 406, the wheel end temperature signal is sent to a CAN port (e.g., CAN port 44 (FIG. 4)).

At step 408, the wheel end temperature is extracted from the wheel end temperature signal. For example, processor 24 may extract the wheel end temperature from the wheel end temperature signal. At step 410, the wheel end temperature is compared to the wheel end temperature threshold (e.g., processor 24 may perform this comparison). If the wheel end temperature is not greater than the wheel end temperature threshold, the process repeats again at step 402. If the wheel end temperature is greater than the wheel end temperature threshold, the process moves to step 412.

At step 412, a determination is made as to whether a brake monitoring signal is generated or present (e.g., processor 24 may perform this determination). The process for generating a brake monitoring signal is described below in connection with FIG. 16B. If the brake monitoring signal has not been generated, the process moves back to step 402. If the brake monitoring signal has been generated, the process moves to step 414. At step 414, a wheel monitoring signal is generated (e.g., processor 24 may generate the signal). Then, at step 416, an alarm is generated. The alarm may be generated by alarm 130 in response to receiving the wheel monitoring signal from processor 24. The wheel monitoring signal may also be sent over PLC cable 84 to a tractor and received by an alarm in the tractor that alerts the driver to the presence of the wheel monitoring signal.

After the wheel monitoring signal is generated at step 414, the process may reset back to step 402 so that it is continuously determined whether the conditions are met for generation of the wheel monitoring signal. The wheel monitoring signal may also be reset by a user or after a predetermined time period, at which time the process continues from step 402. If the wheel monitoring signal is not generated, the process may continuously repeat to determine whether the conditions are met for generation of the wheel monitoring signal.

As shown in FIG. 16B, the process for generating a brake monitoring signal starts at step 418 when the following are received: a brake supply pressure threshold, a first brake control pressure threshold, and a second brake control pressure threshold. For example, processor 24 may receive these thresholds as described above. At step 420, a brake supply pressure is monitored. For example, processor 24 may monitor the brake supply pressure by continuously receiving the brake supply pressure from pressure sensor 62, as described above. At step 422, the brake supply pressure is compared to the brake supply pressure threshold (e.g., processor 24 may perform the comparison). If the brake supply pressure is less than the brake supply pressure threshold, a brake monitoring signal is generated at step 424 (e.g., processor 24 may generate the signal). If the brake supply pressure is not less than the brake supply pressure threshold, the process moves to step 426.

At step 426, a brake control pressure is monitored. For example, processor 24 may monitor the brake control pressure by continuously receiving the brake control pressure from pressure sensor 53, as described above. At step 428, a determination is made as to whether a stop lamp power signal is present. For example, processor 24 may determine whether a stop lamp power signal is present with the processor 24 receiving the stop lamp power signal from PLC cable 84. If the stop lamp power signal is present, the process moves to step 430, and if not to step 432 described below. At step 430, the brake control pressure is compared to the second brake control pressure threshold (e.g., processor 24 may perform the comparison). If the brake control pressure is not greater than the second brake control pressure threshold (i.e., an indication that the stop lamp power signal is present when the brake control pressure is at a level that is insufficient to apply the brakes), the process moves to step 424, at which the brake monitoring signal is generated. If the brake control pressure is greater than the second brake control pressure threshold, the process moves back to step 420.

If the stop lamp power signal is not present, at step 432, the brake control pressure is compared to the first brake control pressure threshold (e.g., processor 24 may perform the comparison). If the brake control pressure is greater than the first brake control pressure threshold (i.e., an indication that the stop lamp power signal is not present when the brake control pressure is at a level that is sufficient to apply the brakes), the process moves to step 424, at which the brake monitoring signal is generated. If the brake control pressure is not greater than the first brake control pressure threshold, the process moves back to step 420.

After the brake monitoring signal is generated at step 424, the process may reset back to step 420 so that it is continuously determined whether the conditions are met for generation of the brake monitoring signal. The brake monitoring signal may also be reset by a user or after a predetermined time period, at which time the process continues from step 420. If the brake monitoring signal is not generated, the process may continuously repeat to determine whether the conditions are met for generation of the brake monitoring signal.

From the foregoing it will be seen that this invention is one well adapted to attain all ends and objectives hereinabove set forth, together with the other advantages which are obvious and which are inherent to the invention.

Since many possible embodiments may be made of the invention without departing from the scope thereof, it is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

What is claimed and desired to be secured by Letters Patent is as follows:

1. A method for monitoring a wheel system, the method comprising:
　comparing a wheel end temperature to a wheel end temperature threshold;
　determining whether a brake supply pressure is less than a brake supply pressure threshold;
　determining whether a brake control pressure is greater than a first brake control pressure threshold when a stop lamp power signal is not present;
　determining whether the brake control pressure is not greater than a second brake control pressure threshold when the stop lamp power signal is present;
　generating a brake monitoring signal when at least one of the following brake monitoring conditions has occurred:
　　(i) the brake supply pressure is less than the brake supply pressure threshold, wherein the brake supply pressure is a pressure supplied to an emergency brake chamber of a brake actuator for disengaging an emergency brake of the brake actuator;

(ii) the brake control pressure is greater than the first brake control pressure threshold and the stop lamp power signal is not present, wherein the brake control pressure is a pressure supplied to a service brake chamber of the brake actuator for engaging a service brake of the brake actuator; or (iii) the stop lamp power signal is present and the brake control pressure is not greater than the second brake control pressure threshold; and generating a wheel monitoring signal if a brake monitoring signal is generated when the wheel end temperature is greater than the wheel end temperature threshold.

2. The method of claim 1, further comprising generating at least one of a visible alarm or an audible alarm after the wheel monitoring signal is generated.

3. The method of claim 2, wherein the at least one of a visible alarm or an audible alarm is generated so that it may be viewed or heard by a driver of a vehicle.

4. The method of claim 1, further comprising receiving the wheel end temperature threshold prior to the step of comparing the wheel end temperature to the wheel end temperature threshold.

5. The method of claim 1, further comprising measuring the wheel end temperature of a wheel end with a wheel end temperature sensor, and generating a wheel end temperature signal based on the wheel end temperature.

6. The method of claim 5, wherein the wheel end temperature signal is generated in an SAE J1939 format.

7. The method of claim 6, further comprising sending the wheel end temperature signal to a controller area network ("CAN") port of a control module.

8. The method of claim 7, further comprising extracting the wheel end temperature from the wheel end temperature signal with a processor of the control module.

9. The method of claim 8, wherein the processor compares the wheel end temperature to the wheel end temperature threshold.

10. The method of claim 5, wherein the wheel end temperature sensor is selected from the group consisting of a tire temperature sensor, a wheel bearing temperature sensor, and a brake actuator temperature sensor.

11. The method of claim 1, further comprising:
monitoring the brake supply pressure of a brake valve with a control module;
monitoring the brake control pressure of the brake valve with the control module; and
monitoring for the presence of the stop lamp power signal with the control module.

12. The method of claim 11, wherein a processor of the control module performs the following steps:
comparing the brake supply pressure to the brake supply pressure threshold; and
comparing the brake control pressure to the first brake control pressure threshold and to the second brake control pressure threshold.

13. The method of claim 12, wherein the processor generates the brake monitoring signal when at least one of the brake monitoring conditions has occurred, wherein the processor compares the wheel end temperature to the wheel end temperature threshold, and wherein the processor generates the wheel monitoring signal if the brake monitoring signal is generated when the wheel end temperature is greater than the wheel end temperature threshold.

14. The method of claim 1, wherein each of the first brake control pressure threshold and the second brake control pressure threshold is between approximately 0 to 4 psi.

15. The method of claim 1, wherein the brake supply pressure threshold is approximately equal to a minimum brake supply pressure level necessary to disengage a spring brake.

16. The method of claim 1, further comprising generating at least one of a visible alarm or an audible alarm when both the wheel monitoring signal is generated and a wheel slip condition is sensed.

17. A brake monitoring system comprising:
a control module comprising a processor that is configured to:
compare a wheel end temperature to a wheel end temperature threshold;
determine whether a brake supply pressure is less than a brake supply pressure threshold;
determine whether a brake control pressure is greater than a first brake control pressure threshold when a stop lamp power signal is not present;
determine whether the brake control pressure is not greater than a second brake control pressure threshold when the stop lamp power signal is present;
generate a brake monitoring signal when at least one of the following brake monitoring conditions has occurred:
(i) the brake supply pressure is less than the brake supply pressure threshold, wherein the brake supply pressure is a pressure supplied to an emergency brake chamber of a brake actuator for disengaging an emergency brake of the brake actuator;
(ii) the brake control pressure is greater than the first brake control pressure threshold and the stop lamp power signal is not present, wherein the brake control pressure is a pressure supplied to a service brake chamber of the brake actuator for engaging a service brake of the brake actuator; or
(iii) the stop lamp power signal is present and the brake control pressure is not greater than the second brake control pressure threshold; and
generate a wheel monitoring signal if a brake monitoring signal is generated when the wheel end temperature is greater than the wheel end temperature threshold.

18. The brake monitoring system of claim 17, further comprising a wheel end temperature sensor that is operable to measure the wheel end temperature of a wheel end, wherein the wheel end temperature sensor is electrically coupled to a CAN port of the control module.

19. The brake monitoring system of claim 18, wherein the wheel end temperature sensor generates a wheel end temperature signal in an SAE J1939 format, and sends the wheel end temperature signal to the CAN port.

20. The brake monitoring system of claim 19, wherein the wheel end temperature sensor is selected from the group consisting of a tire temperature sensor, a wheel bearing temperature sensor, and a brake actuator temperature sensor.

21. The brake monitoring system of claim 17, further comprising a brake valve comprising an emergency brake pressure outlet that supplies air at the brake supply pressure, and a service brake pressure outlet that supplies air at the brake control pressure.

22. The brake monitoring system of claim 21, further comprising a first pressure sensor that is coupled to the brake valve and electrically coupled to the control module, wherein the first pressure sensor measures the brake supply pressure and generates a brake supply pressure signal based on the brake supply pressure.

23. The brake monitoring system of claim 22, further comprising a second pressure sensor that is coupled to the brake valve and electrically coupled to the control module, wherein the second pressure sensor measures the brake control pressure, and generates a brake control pressure signal based on the brake control pressure.

24. The brake monitoring system of claim 23, wherein the processor receives the brake supply pressure signal and determines the brake supply pressure corresponding to the brake supply pressure signal, and wherein the processor receives the brake control pressure signal and determines the brake control pressure corresponding to the brake control pressure signal.

25. The brake monitoring system of claim 17, wherein the control module comprises a power input that is configured for connection with a power line carrier ("PLC") cable, wherein the power input is configured to receive the stop lamp power signal from the PLC cable, and wherein the power input is configured to send the stop lamp power signal to the processor.

26. The brake monitoring system of claim 17, further comprising an alarm system that is electrically coupled to the control module, wherein the processor sends the wheel monitoring signal to the alarm system, and wherein the alarm system generates at least one of a visible alarm or an audible alarm when it receives the wheel monitoring signal.

27. The brake monitoring system of claim 17, further comprising an alarm system that is electrically coupled to the control module, wherein the processor sends the wheel monitoring signal to the alarm system, and wherein the alarm system generates at least one of a visible alarm or an audible alarm when it receives both the wheel monitoring signal and a wheel slip signal corresponding to a wheel slip event.

* * * * *